United States Patent [19]

Infanti

[11] Patent Number: 5,791,731
[45] Date of Patent: Aug. 11, 1998

[54] ADJUSTABLE GAME STOOL ASSEMBLY WITH FLAT BASE

[75] Inventor: Vittorio Infanti, Matawan, N.J.

[73] Assignee: Infanti Chair Manufacturing Corporation, Staten Island, N.Y.

[21] Appl. No.: 821,220

[22] Filed: Mar. 20, 1997

Related U.S. Application Data

[63] Continuation-in-part of Ser. No. 543,750, Oct. 16, 1995, Pat. No. 5,678,886, which is a continuation-in-part of Ser. No. 410,138, Mar. 23, 1995, which is a continuation-in-part of Ser. No. 317,762, Oct. 4, 1994, Pat. No. 5,522,641, which is a continuation-in-part of Ser. No. 106,069, Aug. 13, 1993, abandoned.

[51] Int. Cl.$^6$ ............................................. A47B 97/00
[52] U.S. Cl. .................... 297/217.3; 297/172; 297/463.1
[58] Field of Search .......................... 297/172, 217.1, 297/217.3, 463.1; 403/230, 393; 248/221.11

[56] References Cited

U.S. PATENT DOCUMENTS

| | | |
|---|---|---|
| 1,326,417 | 12/1919 | Paine . |
| 2,312,030 | 2/1943 | Cramer et al. ............ 248/430 |
| 2,989,280 | 6/1961 | Newman . |
| 3,542,326 | 11/1970 | Reapsummer . |
| 3,620,495 | 11/1971 | Korab .......................... 248/430 |
| 4,570,997 | 2/1986 | Tanizaki et al. . |
| 4,671,572 | 6/1987 | Young et al. . |
| 4,840,343 | 6/1989 | Gasser . |
| 5,082,328 | 1/1992 | Garelick . |
| 5,083,738 | 1/1992 | Infanti .................... 297/217.3 |
| 5,090,770 | 2/1992 | Heinrichs et al. . |
| 5,114,112 | 5/1992 | Infanti .................... 297/217.3 |
| 5,232,191 | 8/1993 | Infanti .................... 297/217.3 |
| 5,234,189 | 8/1993 | Meyers . |
| 5,522,641 | 6/1996 | Infanti .................... 297/217.3 |
| 5,542,748 | 8/1996 | Barile ..................... 297/463.1 |

*Primary Examiner*—Peter R. Brown
*Attorney, Agent, or Firm*—Anthony J. Casella; Gerald E. Hespos; Ludomir A. Budzyn

[57] ABSTRACT

A detachable and fully adjustable game stool assembly for a slot machine including an elongated flat base member having a guided engaging portion at one end for guiding the base member into slidable detachable engagement with a rigid support member fixed to the gaming machine, and including a locking means for interlocking the guided engaging portion of the base member and the fixed support member. The locking means and fixed support member prohibit longitudinal and lateral movement of the flat base member relative to the gaming machine. In one embodiment of the subject invention the locking means comprises a plurality of threaded locking pins which engage locking apertures and recesses provided in the fixed support member and elongated base member. In an alternative embodiment of the invention, the locking means comprises an elongated latch member pivotally mounted to the fixed support member so as to engage a locking recess provided in the flat base member. In both embodiments of the invention, the game stool assembly can be readily slidably attached to and slidably disengaged from the gaming machine to permit easy access to the cash box located inside the gaming machine.

5 Claims, 16 Drawing Sheets

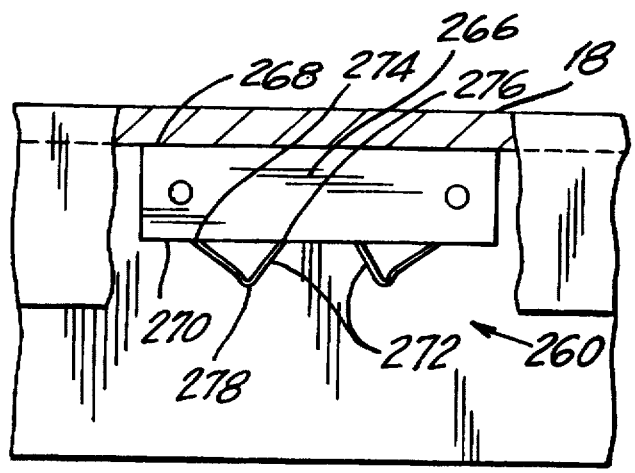
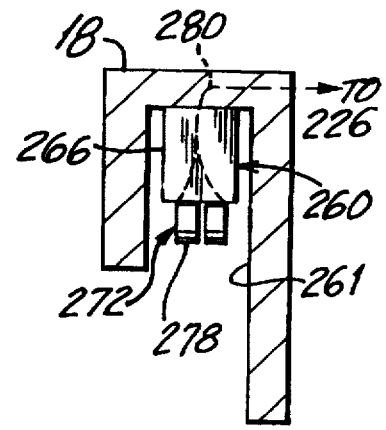
FIG. 19    FIG. 20
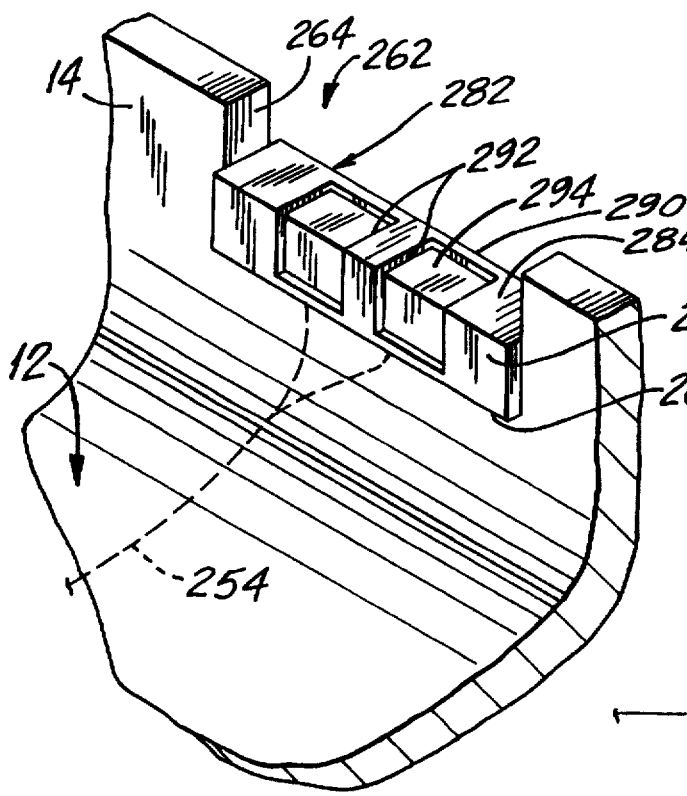
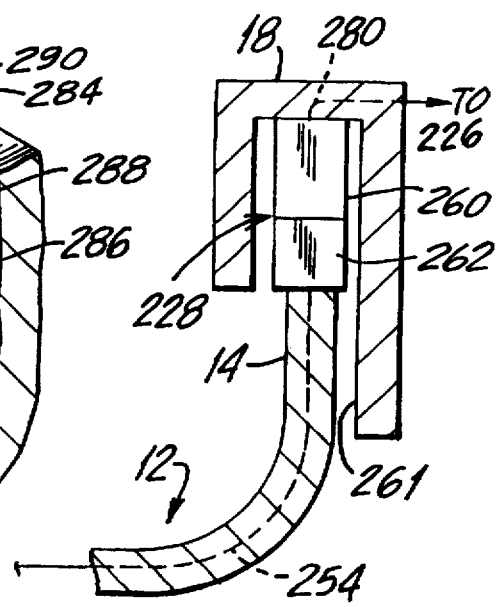
FIG. 21    FIG. 22

ADJUSTABLE GAME STOOL ASSEMBLY WITH FLAT BASE

CROSS REFERENCE TO RELATED APPLICATIONS

This application is a continuation-in-part of applicant's U.S. patent application Ser. No. 08/543,750, filed on Oct. 16, 1995 now U.S. Pat. No. 5,678,886, which is a continuation-in-part of applicant's U.S. patent application Ser. No. 08/410,138, filed on Mar. 23, 1995, which is a continuation-in-part of applicant's U.S. patent application Ser. No. 08/317,762, filed on Oct. 4, 1994, allowed, now U.S. Pat. No. 5,522,641, which is a continuation-in-part of applicant's U.S. patent application Ser. No. 08/106,069, filed on Aug. 13, 1993, abandoned.

BACKGROUND OF THE INVENTION

Casino game machines, and in particular slot machines, in a casino or elsewhere, are often used by patrons for extended periods of time. To ensure the comfort of the patrons, casinos and game halls provide their customers with a chair or stool. The prior art has focused on connecting the game stools to the game machines in order to prevent game stools from being dislocated and thereby detracting from the aesthetic appearance of the symmetric gaming machines within the casino, and also from interfering with the flow of traffic around the gaming machines.

Examples of prior art detachable game stool assemblies are disclosed in applicant's U.S. Pat. No. 5,114,112 which was granted on May 19, 1993 and is entitled "DETACHABLE GAME STOOL ASSEMBLY", applicant's U.S. Pat. No. 5,083,738 which issued on Jan. 28, 1992 and is entitled "DETACHABLE GAME STOOL ASSEMBLY", and applicant's U.S. Pat. No. 5,232,191 which was issued on Aug. 3, 1993 and is entitled "DETACHABLE GAME STOOL ASSEMBLY". U.S. Pat. No. 5,114,112 discloses an assembly for detachably supporting a game stool relative to a casino slot machine and generally comprising an elongated planar base member having an upturned portion at one end, a chair configuration extending from the base member opposite the upturned portion, and an extruded rigid support member fixed to the base of the slot machine. The chair configuration includes a vertical post rigidly connected to the base member and a chair seat fixed to the upper portion of the post. The extruded rigid support member includes an upstanding base portion mounting to the slot machine, a cantilevered portion, and an angularly inclined portion which together define an engaging channel for receiving the upturned portion of the base member thereby prohibiting longitudinal movement of the base member relative to the slot machine. The support member secured to the slot machine further includes a pair of spaced apart rigid end stop members which extend downwardly from the opposed ends of the cantilevered portion of the support member within the engaging channel for prohibiting lateral movement of the upturned portion of the base member relative to the gaming machine.

When the base member disclosed in U.S. Pat. No. 5,114,112 is engaged with the extruded rigid support secured to the slot machine, the location of the seat is fixed at a certain distance relative to the slot machine. When required, the assembly may be detached from the slot machine in order for casino employees to empty out the cash box located within the lower front surface of the gaming machine.

Other prior art devices for attaching a game stool to a game machine also include seat portions which are fixed at a certain distance relative to the slot machine. The prior art assemblies are generally connected to the slot machines by a plurality of bolts or other connecting means which fasten the base member to the base of the casino slot machine. Therefore in order to access the cash box located within the base of the gaming machine, a casino employee must position himself in a crouched condition, between the game machine and the upstanding seat configuration so as to remove the coinage from the cash box.

Despite the many advantages of the aforementioned prior art detachable game stool assemblies, one of the shortcomings of the prior art assemblies is that the seat is always located at a predetermined fixed distance from the front of the slot machine. Usually, this predetermined distance is chosen to reflect the size of the "average" casino patron. As can readily be appreciated, because of the different physical characteristics of the men and women who play slot machines, this fixed distance is often uncomfortable to many players. Stated differently, because of the limitations of the prior art seating devices, usually a patron's height, physical stature or other physical characteristics make it difficult and uncomfortable for the patron to easily operate the slot machine over a long period of time. The patron may not be able to comfortably reach the coinage slot or the bottom or lever arm of the slot machine in order to comfortably activate it over a long period of time. Accordingly, it has been found that some patrons opt to stand rather than sit in order to more easily operate the slot machine, thereby defeating the main purpose of attaching the game stool to the slot machine. Further still, it has been found that the patrons who are uncomfortable when sitting on a fixed game stool seat will not play for a long period of time, thereby resulting in the casino potentially loosing income.

To accommodate both the needs of the patrons and the casino hall operators the subject invention provides a detachable and adjustable game stool assembly including a seat portion that may be adjusted in a forward and backward direction so as to be, respectively, moved closer to or further away from the slot machine in order to comfortably accommodate patrons of various physical characteristics.

A further shortcoming of the prior art is that the seat is always located at a predetermined fixed height. Usually, this predetermined height is chosen to reflect the height of the "average" casino patron. As can be readily appreciated, because of the different heights of the men and women who play slot machines, this fixed height is often uncomfortable to many players. Stated differently, because of the limitations of the prior art seating devices, a patron's height makes it difficult and uncomfortable for the patron to operate the slot machine over a long period of time. The patron may not be able to comfortably reach the coinage slot or the button or lever arm of the slot machine in order to comfortably activate it over a long period of time. In addition, the patron may not be able to fully extend his or her legs and thus experiences physical discomfort over a long period of time. Accordingly, it has been found that some patrons opt to stand rather than to sit in order to more easily and comfortably operate the slot machine, thereby defeating the main purpose of attaching the game stool to the slot machine.

To accommodate patrons of various heights a second embodiment of the subject invention provides a detachable and adjustable game stool assembly including a seat portion that may be adjusted in an upward and downward direction so as to be, respectively, moved closer to or farther away from the base member in order to comfortably accommodate patrons of various heights.

An additional shortcoming of the prior art is the lack of truly distinguishing characteristics between casino seats. In particular, there is typically no difference between a seat detachably attached to a low wager slot machine and the seat detachably attached to a high wager slot machine. Accordingly, it has been found that a patron is less likely to gamble at a high wager machine when his or her neighbor is enjoying the same comfort at a low wager machine. Further still, patrons who don't feel there is any immediate difference between the high wager and low wager slot machines are more likely to play the low wager slot machines, thereby resulting in the casino potentially loosing income.

Accordingly, to accommodate patrons who wish to play high wager gaming machines in a more luxurious comfort a third embodiment of the subject invention provides a detachable and adjustable game stool assembly including a plush, large seat portion that can through readily accessible switches be actuated for adjustment in a vertically upward or downward direction as well as a horizontally forward and backward direction.

Another shortcoming of the prior art assemblies is the lack of game stool seats having the ability to sooth a patron's fatigued lower back muscles. Usually, a patron who sits at a slot machine for an extended period of time experiences lower back pains. This is due to the lack of stimulation received by a patron's back muscles while the patron is sitting on a game stool. Accordingly, it has been found that a patron may opt to stand rather than sit to alleviate the discomfort of a fatigued back. Further still, it has been found that a patron is likely to leave the slot machine in order to stretch. As a result, it has been found that patrons who become uncomfortable when sitting on a game stool seat will not play for a long period of time, thereby resulting in the casino potentially losing income.

To accommodate the needs of the patron, a fourth embodiment of the subject invention provides a detachable and adjustable game stool assembly including a seat portion having a vibrator within the back portion of the seat that can, through a readily accessible switch, be actuated to provide a temporary, soothing vibration along the chair's back portion to stimulate blood flow through a patron's fatigued back muscles.

A further shortcoming of the prior art is that the control panel of the slot machine is always located at a predetermined fixed distance from the seat. As can readily be appreciated, this fixed distance is often uncomfortable to many players because they must lean forward and stretch in order to actuate the slot machine controls. The patron may not be able to comfortably reach the buttons or lever arm of the slot machine in order to activate the slot machine over a long period of time. Accordingly, it has been found that some patrons opt to stand rather than sit in order to more easily operate the slot machine, thereby defeating the main purpose of attaching the game stool to the slot machine. Further still, it has been found that patrons who are uncomfortable when leaning forward on a fixed game stool seat to operate the slot machine will not play for a long period of time, thereby resulting in the casino potentially losing income.

To accommodate patrons who wish to operate gaming machines in comfort without leaning forward off of the game stool seat, a fifth embodiment of the subject invention provides a detachable and adjustable game stool assembly including a collapsible seat control that can, through readily accessible buttons and keys which are identical to the slot machine controls, be actuated to remotely operate the slot machine.

An additional shortcoming of the prior art is that the back portion of the seat is always located at a predetermined fixed angle with respect to the base portion of the seat. Usually, the back portion is fixed so as to be perpendicular with respect to the base portion. This predetermined fixed angle is chosen because most patrons for a brief period of time can sit in a chair with a fixed vertical back portion in some comfort. As can readily be appreciated, a patron who sits at a slot machine for an extended period of time will find the fixed angle of the back portion to be uncomfortable. In addition, the patron may begin to suffer back fatigue over a long period of time. Accordingly, it has been found that some patrons opt to stand rather than to sit in order to more comfortably operate the slot machine, thereby defeating the main purpose of attaching the game stool assembly to the slot machine. Further still, it has been found that the patrons who are uncomfortable in sitting on a game stool seat with a fixed back portion will not play for a long period of time, thereby resulting in the casino potentially loosing income.

To accommodate the needs of the patron, a sixth embodiment of the subject invention provides a detachable and adjustable game stool assembly including a seat portion having an adjustable back portion that can, through a readily accessible switch, be actuated to angularly tilt the back portion of the seat with respect to the base portion of the seat in order to comfortably accommodate patrons who wish to sit with their backs at an incline.

Another shortcoming of the prior art is that the entire game stool assembly must be tilted in order to detach the game stool assembly from the slot machine in order for casino employees to empty out the cash box located within the lower front surface of the gaming machine. As can readily be appreciated, because of the bulk and weight of some game stool assemblies, removal of these game stool assemblies can be burdensome and time consuming. Stated differently, because of the limitations of the prior art seating devices, casino employees cannot quickly reach the cash box of the casino gaming machine and remove the coinage. As a result, some casino patrons are forced to wait while the detachable game stool assembly is detached from a gaming machine, the game machine is emptied of coinage, and the detachable game stool assembly is reattached to the gaming machine. Accordingly, it has been found that some patrons opt not to wait and go to other casinos which do not utilize detachable game stool assemblies, thereby resulting in the casino potentially losing income.

To accommodate both the needs of the patrons and the casino hall operators, a seventh embodiment of the subject invention provides a detachable assembly having an elongated flat base member with a guided entry portion at one end for slidably engaging a support member fixed to the base of a gaming machine.

Another shortcoming of the prior art assembly is that detachable game stool assemblies often accidentally detach from their gaming machines. As can readily be appreciated, because the patrons rush to move from game to game, they generally do not reattach a detached game stool assembly to its proper gaming machine. As a result, the dislocated game stool assemblies create a chaotic appearance which lessens the aesthetically pleasing environment of the casino. Accordingly, it has been found that some patrons opt to go to other casinos which do not have detachable game stool assemblies for the comfort of their patrons, but do have an overall aesthetically pleasing appearance, thereby defeating the main purpose of attaching a game stool assembly to a gaming machine and resulting in the casino potentially losing income.

To alleviate the effects of dislocated game stool assemblies, the seventh embodiment of the subject invention further provides a detachable game stool assembly including a locking mechanism for preventing a detachable game stool assembly from being accidentally detached from its respective gaming machine.

A further shortcoming of the prior art is the aesthetically unappealing effect that exposed mechanics has on an otherwise aesthetically pleasing game stool configuration. In particular, an exposed adjustable raising mechanism or powered post assembly detracts from the aesthetically pleasing plush game stool seat. As a result, it has been found that some patrons opt to go to other casinos which do not have vertically adjustable seats for the comfort of the patrons but do have an overall aesthetically pleasing appearance, thereby defeating the main purpose of attaching a vertical adjustment mechanism to the seat and resulting in the casino potentially loosing income.

To alleviate the effects of the aesthetically unappealing exposed elevating mechanics, all vertically adjustable embodiments of the subject invention provide an aesthetically pleasing post housing which shields the adjustable raising mechanism or powered post assembly from view.

Another shortcoming of the prior art is the haphazard positions that gaming stools with swivel mechanisms are left in. In particular, gaming stools with swivel mechanisms for swiveling of the seat around a vertical axis for the patron's comfort are often left by the patron with the seat not facing the attached gaming machine. As can readily be appreciated, because the patrons rush to move from game to game, they generally do not return the swivel seat to its proper position. As a result, the misaligned gaming stool seats as a whole create a chaotic appearance which lessens the aesthetically pleasing environment of the casino. Accordingly, it has been found that some patrons opt to go to other casinos which don't have swivel seats for the comfort of the patrons but do have an overall aesthetically pleasing appearance, thereby defeating the main purpose of attaching a swivel mechanism to the seat and resulting in the casino potentially losing income.

To alleviate the effects of misaligned swivel gaming stool seats, all seven of the embodiments of the subject invention may include a self-centering swivel mechanism which allows the seat to be swiveled about a vertical axis and automatically centers the seat, after a patron departs, causing the seat to face its respective gaming machine.

An additional shortcoming of the prior art is the lack of game stool seats that affirmatively attract patrons. In particular, the prior art game stool seat typically lacks ornamentation which would draw a potential patron's attention. As a result, it has been found that a patron is less likely to play a slot machine if there are flashier games elsewhere, thereby resulting in the casino potentially losing income.

Accordingly, to present a more aesthetically attractive gaming machine, all seven of the embodiments of the subject invention may include electric lights, either continuously on or blinking on and off, mounted along the peripheral edge of the game stool seat.

A further shortcoming of the prior art is the difficulty prior art connectors have in establishing and breaking an electrical connection between the game machine and the detachable game stool assembly. In particular, prior art connectors, such as male/female type connectors, are not easily connected or disconnected. Stated differently, prior art connectors require some force to be exerted during connection and disconnection in order to establish and break the electrical path between the game stool assembly and the gaming machine. In addition, the electrical connectors located on the game stool assembly and the gaming machine are typically located in close proximity to the ground. As a result, the electrical connectors are exposed to large amounts of particles and debris which often cause a residue build-up on the contact points of the connectors. Since prior art connectors lack the ability to remove residue the build-up of residue cause degradation of the electrical connection between the game stool assembly and the game machine. As a result, the faulty electrical connection causes the electrical elements of the game stool assembly to either function improperly or not function at all. As can readily be appreciated, it has been found that some patrons become frustrated with dysfunctional game stool assemblies. Further still, it has been found that frustrated patrons will not play for a long period of time, thereby resulting in the casino potentially loosing income.

To alleviate the effects of a degraded electrical connection between an electrically powered game stool assembly and the game machine, all the electrically powered embodiments of the subject invention may include a detachable electrical connection including a resilient wiping connector and a base connector such that the resilient wiping connector wipes the base connector thereby removing any residue on the base connector to establish a superior electrical connection.

It is thus an object of the subject invention to provide a game stool assembly having a seat portion which is manually adjustable toward and away from the slot machine for accommodating patrons of different physical characteristics.

It is still a further object of the subject invention to provide a safe and easy-to-operate adjustable game stool assembly wherein the seat may be readily moved away from or toward the slot machine for the convenience of the individual patron.

It is another object of the subject invention to provide an adjustable game stool assembly including a seat which is both moveable toward and away from the slot machine and swiveled about a vertical axis for maximum comfort of the patron.

It is an object of the second embodiment of the subject invention to provide a game stool assembly having a seat portion which is manually adjustable vertically up and down for accommodating patrons of different heights.

It is a further object of the second embodiment of the subject invention to provide a game stool assembly having a seat which is manually adjustable toward and away from the slot machine for accommodating patrons of different physical characteristics.

It is another object of the second embodiment of the subject invention to provide an adjustable game stool assembly including a seat which is moveable both vertically up and down, horizontally moveable toward and away from the slot machine as well as swiveled about a vertical axis for maximum comfort of the patron.

It is an object of the third embodiment of the subject invention to provide a game stool assembly including readily accessible switches for actuating adjustment of the seat toward and away from the slot machine for accommodating patrons of different physical characteristics who wish to play at a higher wager gaming machine.

It is a further object of the third embodiment of the subject invention to provide a game stool assembly including readily accessible switches for actuating adjustment of the seat vertically up and down for accommodating patrons of different heights who wish to play at a high wager gaming machine.

It is another object of the third embodiment of the subject invention to provide a game stool assembly including readily accessible switches for actuating adjustment of the seat both horizontally toward and away from the slot machine and vertically up and down as well allowing the seat to be swiveled about a vertical axis for maximum comfort of the patron.

It is an object of the fourth embodiment of the subject invention to provide a game stool assembly including a readily accessible switch for actuating vibration of the back portion of the seat for accommodating patrons whose lower back muscles have become fatigued.

It is an object of the fifth embodiment of the subject invention to provide a game stool assembly including a collapsible seat control for remote operation of the slot machine controls for the maximum comfort of the patron.

It is an object of the sixth embodiment of the subject invention to provide a game stool assembly including readily accessible switches for actuating angular tilting of the back portion of the seat with respect to the base portion of the seat.

It is an object of the seventh embodiment of the subject invention to provide a game stool assembly having an elongated base member with a guided entry portion at one end for slidably engaging a support member fixed to the base of a gaming machine.

It is another object of the seventh embodiment of the subject invention to provide a game stool assembly including a locking mechanism which prevents the game stool assembly from accidentally being detached from the gaming machine.

It is an object of all of the embodiments of the subject invention to provide an adjustable game stool assembly including a swivel mechanism which both allows the seat to be swiveled about a vertical axis and is self-centering so it automatically faces the gaming machine after the patron has left the game stool assembly.

It is another object of all the embodiments of the subject invention to provide an adjustable game stool assembly including electrical lights mounted on the seat for the affirmative attraction of patrons.

It is an object of all the electrical embodiments of the subject invention to provide an adjustable game stool assembly having a detachable electrical connection including a base connector and a resilient wiper for wiping residue from the base connector to establish a superior electrical connection.

It is a further object of all vertically adjustable embodiments of the subject invention to provide an adjustable game stool assembly having an aesthetically pleasing telescopic post housing for shielding the elevating mechanics of a vertically adjustable game stool assembly.

SUMMARY OF THE INVENTION

The subject invention is directed to an adjustable game stool assembly for use in conjunction with a casino gaming machine, such as a slot machine, and having an elongated base which is connected at one end to the gaming machine, while at the other end there is provided an adjustable seat configuration to enable the patron to adjust the seat toward or away from the gaming machine to a comfortable position. More particularly, the adjustable seat configuration generally comprises a vertical post fixed to the elongated base member, and the seat is connected to the vertically extended post through an adjustable mounting means which includes guide rails and a locking mechanism that is easily and quickly operated by the patron for adjustment of the seat toward or away from the gaming machine. In addition, the seat may be connected to the adjustable mounting means through a swivel connection such that the patron may not only adjust his or her position toward or away from the gaming machine, but may also swivel the chair about a vertical axis for additional comfort.

In a second embodiment of the adjustable game stool assembly there is provided an adjustable seat configuration to enable the patron to adjust the seat vertically up or down as well as to adjust the seat toward or away from the gaming machine to a comfortable position. More particularly, the adjustable seat configuration generally comprises a vertically extending post assembly fixed to the elongated base member at one end, while at the other end the post assembly is detachably engaged with an adjustable raising means which includes a gas cylinder assembly and actuating means that is easily and quickly operated by the patron for adjustment of the seat vertically up or down. The seat is connected to the adjustable raising means through an adjustable mounting means which includes guide rails and a locking mechanism that is easily and quickly operated by the patron for adjustment of the seat toward or away from the-gaming machine. In addition, the seat may be connected to the adjustable mounting means through a swivel connection such that the patron may not only adjust his or her position both vertically up or down and horizontally toward or away from the gaming machine, but may also swivel the chair about a vertical axis for additional comfort.

In the third embodiment of the adjustable game stool assembly there is provided an adjustable seat configuration including readily accessible switches for actuation of the adjustable seat configuration to allow the patron to quickly and easily adjust the seat both vertically up and down as well as horizontally toward and away from the gaming machine to a comfortable position. More particularly, the adjustable seat configuration generally comprises a vertically extending powered post assembly which is fixed to the elongated base and is actuated through a readily accessible switch such that the patron may quickly and easily adjust the seat vertically up and down, and the seat is connected to the powered post assembly through a powered mounting means for adjustment of the seat toward and away from the game stool assembly and actuated through a readily accessible switch. In addition, the seat may be connected to the powered mounting means through a swivel connection such that the patron may not only actuate his or her position both vertically up or down and horizontally toward or away from the gaming machine, but may also swivel the chair about the vertical axis for additional comfort.

In the fourth embodiment of the adjustable game stool assembly there is provided an adjustable seat configuration including a vibrating seat assembly to allow a patron to quickly and easily soothe a painful back. More particularly, the vibrating seat assembly generally comprises a vibrating mechanism which is fixed to the back portion of the seat and is actuated through a readily accessible switch such that the patron may quickly and easily actuate the vibrator to soothe the portion of the patron's back that rests against the back portion of the seat. The vibrating seat assembly may be connected to an adjustable raising means through an adjustable mounting means. Alternatively, the vibrating seat assembly may be connected to a powered post assembly through a powered mounting means. In addition, the vibrating seat assembly may be connected to the powered mounting means or adjustable mounting means through a swivel connection.

In a fifth embodiment of the adjustable game stool assembly there is provided an adjustable seat configuration including a readily accessible collapsible control configuration to allow the patron to quickly and easily operate the gaming machine. More particularly, the collapsible control configuration generally comprises a control pad which is movably connected to an arm which is, in turn, movably attached to the game stool seat such that the patron may quickly and easily set up and collapse the collapsible control configuration in a way similar to a lecture hall collapsible desk top or an airline seat collapsible dining table. Additionally, the control pad is electrically connected to the controls of the gaming machine and is easily actuated by the patron for operating the gaming machine. Furthermore, the control pad could have keys and buttons which are identical to the keys and buttons of the gaming machine. The collapsible control configuration may be movably connected to a vibrating seat assembly which is, in turn, connected to an adjustable raising means through an adjustable mounting means. Alternatively, the collapsible control configuration may be movably connected to a vibrating seat assembly which is connected to a powered post assembly through a powered mounting means.

In a sixth embodiment of the game stool assembly there is provided an adjustable seat configuration including a tiltable seat assembly to allow a patron to quickly and easily angularly tilt the back portion of a seat with respect to the base portion of the seat. More particularly, the tiltable seat assembly generally comprises a tilting mechanism which is connected between the back portion and the base portion of the seat and is actuated through a readily accessible switch such that the patron may quickly and easily actuate the tilting mechanism to angularly tilt the back portion of the seat with respect to the base portion of the seat so that the patron may recline to a comfortable position. The tiltable seat assembly may include a vibrating mechanism which is fixed to the back portion of the seat and is actuated through a readily accessible switch such that the patron may quickly and easily actuate the vibrator to soothe the portion of the patron's back that rests against the inclined back portion of the seat. The tiltable seat assembly may be connected to an adjustable raising means through an adjustable mounting means. Alternatively, the tiltable seat assembly may be connected to a powered post assembly through a powered mounting means. In addition, the tiltable seat assembly may be connected to the powered mounting means or adjustable mounting means through a swivel connection.

In a seventh embodiment of the adjustable game stool assembly there is provided an elongated flat base member having a front edge for slidable detachable engagement with a rigid support member fixed to the gaming machine. More particularly, the seventh embodiment of the subject invention comprises a support member fixed to the base of the casino gaming machine, an elongated flat base member having a guided engagement portion at one end for guiding the base member into proper slidable engagement with the rigid support member, an adjustable chair configuration secured to the base member adjacent the end opposite the guided engagement portion, and a connecting means interlocking the guided entry portion of the base member and the fixed support member. The connecting means is intended to prohibit longitudinal and lateral movement of the base member relative to the casino game machine as well as to prohibit accidental disengagement of the base member from the support member. In operation, the connecting means can be readily removed, allowing the base member to be slidably disengaged from the fixed support member to permit easy access to a cash box located inside the gaming machine.

In all vertically adjustable embodiments of the game stool assembly there is provided an adjustable seat assembly including an aesthetic telescopic post housing which shields the elevating mechanics from view. Alternatively, the aesthetic telescopic post housing may be used to shield the powered post assembly from view. More particularly, the aesthetic telescopic post housing generally comprises an outer cylinder which is fixed to the elongated base member and surrounds the elevating mechanics of the adjustable seat assembly. The outer cylinder is adapted to slidably engage and telescopically mate with an inner cylinder which is connected to the adjustable mounting means. In operation, the inner cylinder projects out of or recedes into the outer cylinder as the adjustable raising means is operated by the patron for adjustment of the seat vertically up or down.

Furthermore, in all seven of the embodiments of the subject invention the swivel connection of the adjustable seat configuration may include a self-centering mechanism for ensuring that the seat faces the gaming machine after a patron departs and thus enhances the aesthetically pleasing environment of the casino.

Additionally, in all seven of the embodiments of the subject invention, the adjustable seat configuration may include electrical lights mounted to the upper portion of the back rest and arms of the seat, thereby enhancing the aesthetic attractiveness of the gaming machine.

Moreover, in all the electrically powered embodiments of the subject invention there is provided a detachable wiping connector assembly which provides an electrical connection of high integrity between the game stool assembly and the game machine. More particularly, the wiping connector assembly generally comprises a first housing and a second housing. The first housing is connected to a rigid support member which, in turn, is fixedly connected to the game machine. The first housing includes a plurality of resilient cantilevered V-shaped arms with the apex of the V defining the intermediate projecting contact point of each arm. Each V-shaped arm has a first end fixedly mounted within the first housing and a second end slidably engaged with the first housing. Additionally, the resilient V-shaped arms are electrically connected to the power supply of the game machine. The second housing is connected to the upturned portion of the elongated base member and includes a plurality of recessed planar contacts which correspond to the V-shaped arms of the first housing. Additionally, the recessed contacts are electrically connected to the electrical elements, such as the powered post assembly, of the game stool assembly. In operation, the first housing and corresponding second housing are forced together when the adjustable and detachable game stool assembly is attached to the game machine. As a result, the V-shaped arms of the first housing engage the corresponding recessed contacts of the second housing. In particular, the resilient V-shaped arms wipe across the surface of the recessed contacts as the recessed contacts push the second end of the V-shaped contacts within the first housing. Accordingly, the resilient V-shaped arms of the first housing wipe the residue off the recessed contacts of the second housing and thereby engage the recessed contacts in an electrical connection of high integrity.

All seven embodiments of the game stool assembly of the subject invention may be employed in a detachable game stool assembly of the type disclosed in applicant's U.S. Pat. Nos. 5,114,112, 5,083,738 and 5,232,191 and may also be employed in conjunction with the type of gaming machine stool assemblies wherein the front edge of the base of the stool assembly is fixedly connected to the gaming machine. In summary, there is provided a new and improved detachable and adjustable game stool assembly which affords the patron maximum comfort and adjustability in order to adjust the seat at a proper position from the gaming machine according to the physical characteristics of the patron.

In summary, the second embodiment of the subject invention provides a new and improved detachable and adjustable game stool assembly which affords the patron maximum comfort and adjustability in order to adjust the seat the proper distance from both the ground and the gaming machine according to the height and other physical characteristics of the patron.

In summary, the third embodiment of the subject invention provides a new and improved detachable and adjustable game stool assembly which allows the patron to actuate the seat to the proper distance from both the ground and the gaming machine according to the physical characteristics of the patron in order to afford the patron maximum comfort and adjustability.

In summary, the fourth embodiment of the subject invention provides a new and improved detachable and adjustable game stool assembly which allows the patron to vibrate the back portion of the seat in order to soothe the fatigued back muscles of the patron.

In summary, the fifth embodiment of the subject invention provides a new and improved detachable and adjustable game stool assembly which allows the patron to remotely operate the gaming machine thereby alleviating the discomfort associated with leaning forward away from the back portion of the game stool seat when operating the gaming machine controls.

In summary, the sixth embodiment of the subject invention provides a new and improved detachable and adjustable game stool assembly which allows the patron to angularly tilt the back portion of the seat into a reclined position in order to provide the patron maximum comfort.

In summary, the seventh embodiment of the subject invention provides a new and improved detachable and adjustable game stool assembly which can be slidably engaged with and interlocked to a gaming machine.

In summary, there are provided new and improved game stool assemblies which all ensure the casino retains its aesthetically pleasing appearance by keeping the game stool's seat facing the gaming machine.

In summary, there are provided new and improved game stool assemblies which all attract potential patrons through electrical lighting which is mounted on the seat.

In summary, there are provided new and improved game stool assemblies which all ensure electrical connections of high integrity between the game stool assembly and the game machine.

In summary, there are provided new and improved game stool assemblies which ensure the casino retains its aesthetically pleasing appearance by shielding the elevating mechanics of an adjustable game stool assembly from view.

BRIEF DESCRIPTION OF THE DRAWINGS

FIG. 19 is a front elevational view, partially in section, of a portion of the adjustable game stool assembly of the subject invention illustrating the first housing of the wiping connector assembly.

FIG. 20 is a side elevational view, partially in section, of a portion of the adjustable game stool assembly of the subject invention illustrating the first housing of the wiping connector assembly.

FIG. 21 is a perspective view, partially in section, of a portion of the adjustable game stool assembly of the subject invention illustrating the second housing of the wiping connector assembly.

FIG. 22 is a side elevational view, partially in section, of the adjustable game stool assembly of the subject invention illustrating the interengagement of the first housing and the second housing of the wiping connector assembly.

DETAILED DESCRIPTION OF THE PREFERRED EMBODIMENTS

Figure 1:
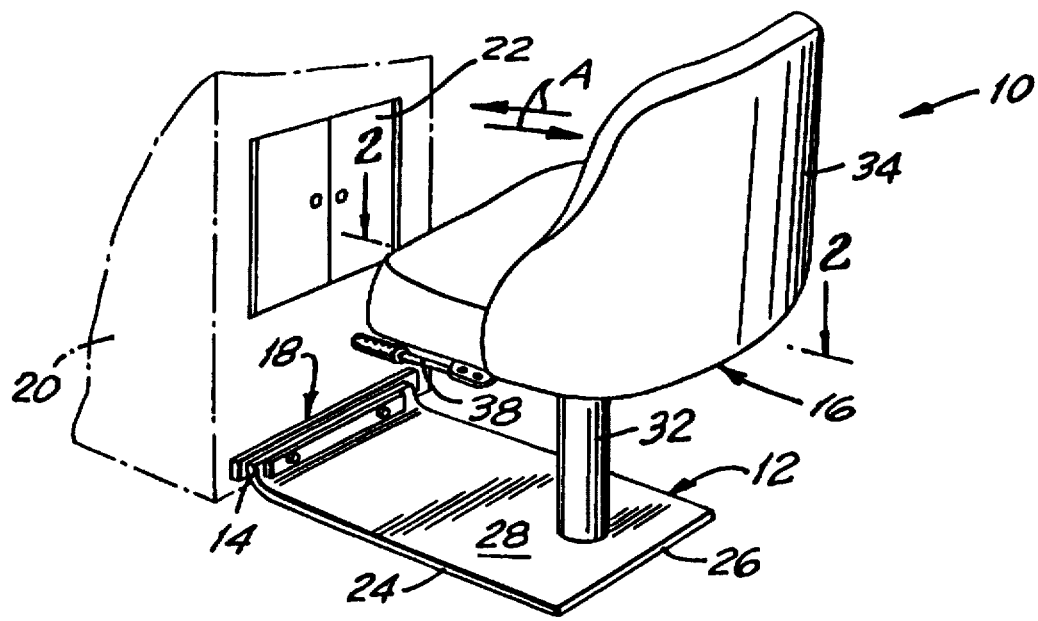
FIG. 1 is a perspective view of the first embodiment of the adjustable game stool assembly of the subject invention as detachably attached to a slot machine.

The adjustable game stool assembly of the subject invention is illustrated in FIG. 1 and is generally designated by the reference numeral 10. The adjustable game stool assembly 10 basically comprises an extruded elongated flat base member 12 having an upturned portion 14 at one end, an adjustable seat configuration 16 extending from the base member opposite the upturned portion 14, and a rigid support member 18 fixed to the base of the gaming machine 20 having an internal cash box 22. The game stool assembly may be detached from the slot machine 20 by pivoting the assembly such that the upturned portion 14 of the base At member 12 is disengaged from the rigid support member 18 and then moving the assembly 10 away from the slot machine such that an attendant may have easy access to the cash box 22. The detachable interconnection between the adjustable game stool assembly 10 and the rigid support member 18 and the operation thereof is similar to that disclosed in the applicant's U.S. Pat. Nos. 5,114,112, 5,083, 738 and 5,232,191, the disclosures of which are incorporated herein by reference.

The extruded base member 12 of the adjustable game stool assembly 10 of the subject invention comprises an elongated flat portion 24 having a rear edge 26 and having an upper surface face 28. The base member 12 is formed with upturned engaging portion 14 extending generally perpendicular to the plane thereof and the adjustable seat configuration 16 is secured to the upper surface 28 of the base member 12 adjacent to the rear edge 26 thereof. The adjustable seat configuration 16 includes a cylindrical post 32 which supports a cushioned seat 34 through means of an adjustable seat support mechanism 36 which is shown in greater detail in FIGS. 2 through 5. The adjustable seat support mechanism 36 enables the patron playing the slot machine 20 to manually affect movement of the seat 34 either toward or away from the slot machine 20 in the direction as indicated by the arrows "A" in FIG. 1 so as to move the seat closer to or further away from the slot machine to a comfortable position in order to enable the patron to play the slot machine 20 over an extended period of time in comfort and with minimum fatigue. As fully described hereinafter, to adjust the position of the seat 34, the patron manually actuates a control handle 38 forming a portion of the adjustable seat support mechanism 36 and by shifting his or her body weight, the seat 34 may be moved either away from or closer to the slot machine 20 to the desired position, after which the patron releases handle 38 to lock the adjustable seat support mechanism 36, thereby fixing the position of the seat 34 relative to the slot machine 20.

Figure 2:
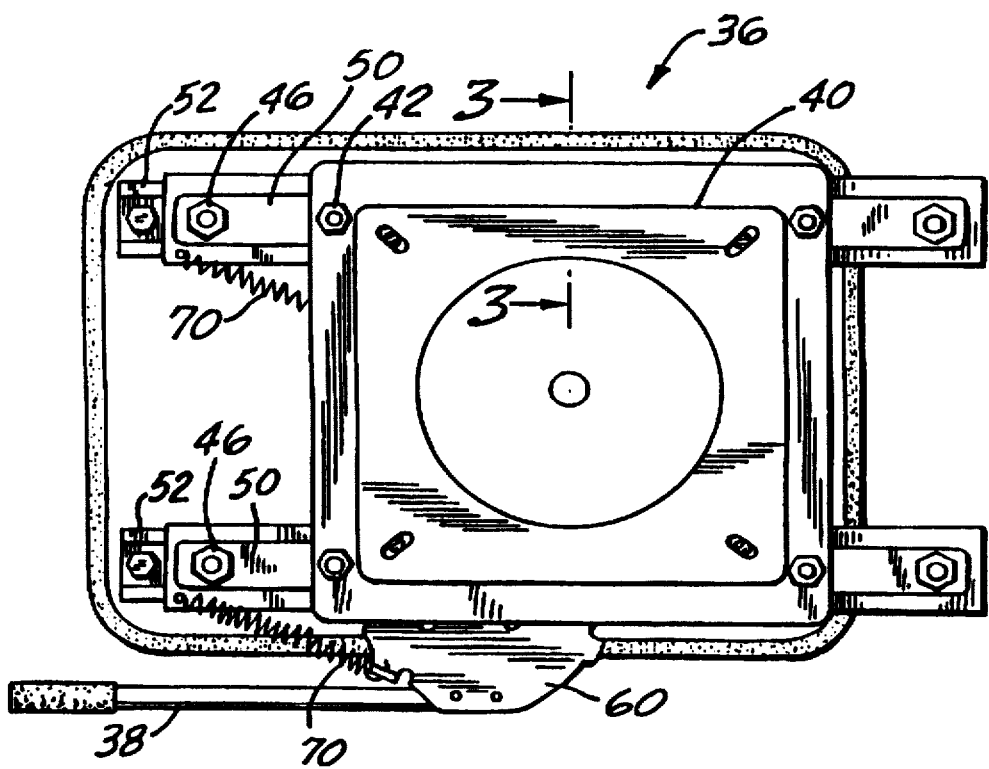
FIG. 2 is a plan view of the adjustable seat support mechanism of the adjustable game stool assembly taken along line 2—2 in FIG. 1.
Figure 3:
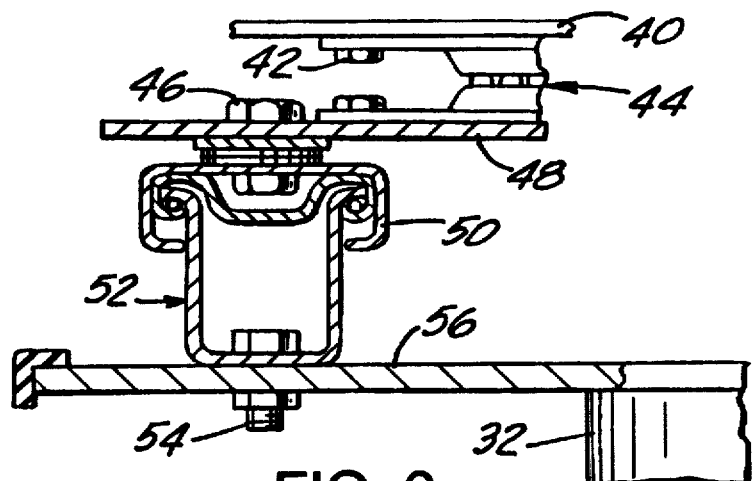
FIG. 3 is a cross-sectional view taken along 3—3 in FIG. 2.
Figure 4:
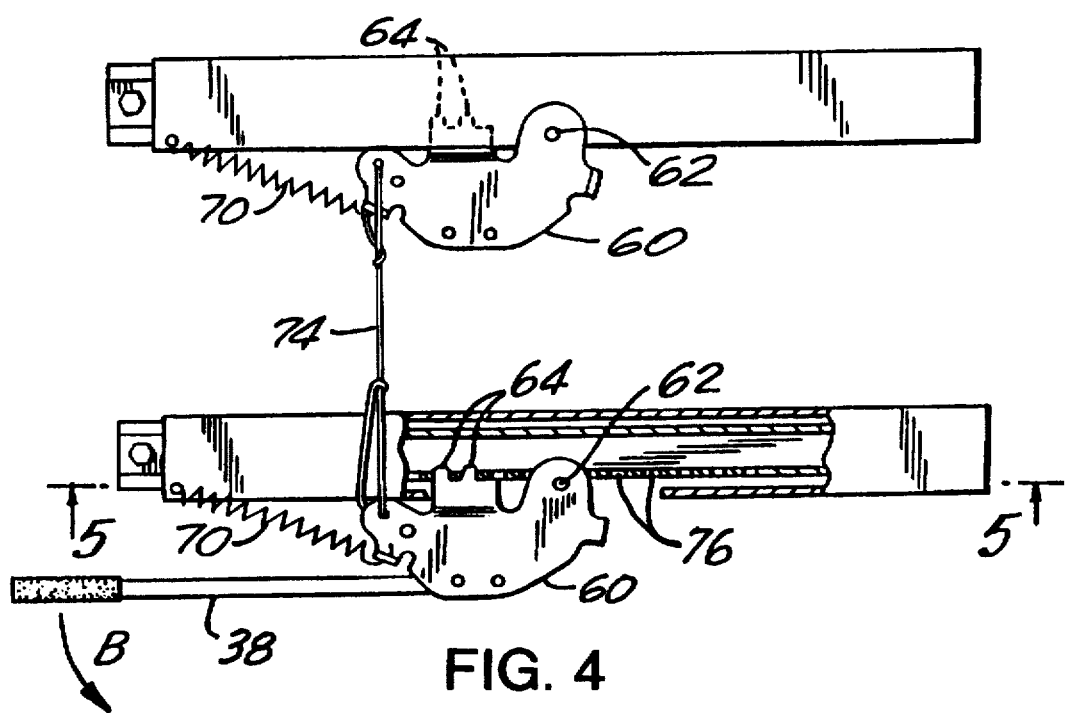
FIG. 4 is a plan view, partially in section, of the actuating portion of the adjustable seat support mechanism without the attachment plates being illustrated.

Turning to FIGS. 2, 3 and 4, the adjustable seat support mechanism 36 of the subject invention includes a plate 40 which is rigidly connected to the undersurface of the seat 34 by suitable bolts 42, and the plate 40 forms a portion of a self-centering swivel mechanism 44 in order to enable the seat 34 to be swiveled about the vertical axis of the post assembly 80. In turn, the swivel mechanism 44 is rigidly connected by bolts 46 to the seat header plate 48. Bolt 46 also connects the seat header plate to slidable rails 50, two of which are provided as part of the adjustable seat support mechanism 36. The rails 50 are disposed in parallel relationship, as shown in FIG. 2. Each slidable rail 50, in turn, is slidably mounted on a fixed U-shaped support rail structure 52, and each slidable rail 50 cooperates with the associated fixed support rail 52 to enable sliding movement of the seat 34 toward and away from the slot machine 20 in the direction as shown by the arrows "A" in FIG. 1. Each fixed rail 52 is, in turn, connected by bolts 54 to the post header plate 56 to which the post 32 is fixedly connected.

The adjustable seat support mechanism 36 also includes a manually operable actuating means for allowing adjustment of the seat 34 and sliding of the slidable rails 50 relative to the fixed support rails 52. The adjustable mechanism 36 includes the actuating handle 38 which is connected to a first locking plate 60 that is pivotally connected as at 62 to a slidable rail 50, with the locking plate 60 including locking tabs, designated by the numeral 64.

Figure 5:
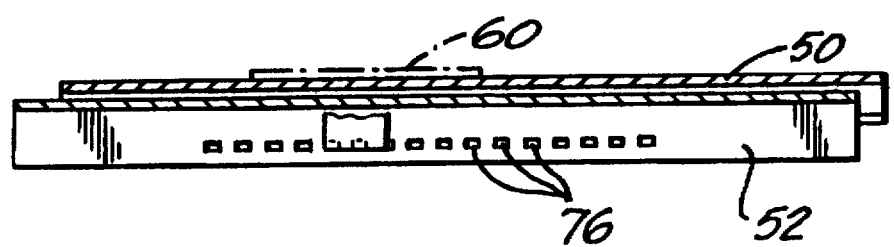
FIG. 5 is a cross-sectional view taken along line 5—5 in FIG. 4.

An identical locking plate mechanism is provided for each rail assembly, as shown in FIG. 4, with the locking plate 60 being spring-biased by spring 70 to the lock position, as more fully described hereinafter. Furthermore, both locking plates 60 are actuated simultaneously by means of interconnecting cable, designated by the numeral 74. As shown in FIGS. 4 and 5, each fixed rail 52 includes a series of locking slots 76 disposed along the longitudinal length thereof, and sized for engagement with the respective locking tabs 64 of the locking plate 60. As shown in FIG. 4, in the locked condition of the adjustable seat support mechanism 36, spring 70 bias the actuation handle 38 such that the locking tab 64 engage the respective locking slot 76 in the fixed support rails 52 for maintaining the seat 34 in a fixed position. In order to move the seat 34 either toward or away from the slot machine 20 in the direction indicated by the arrows "A", the patron merely actuates the locking handle 38 in the direction indicated by the arrow "B" (see FIG. 4) thereby disengaging the locking tab 64 from the locking slots 76 and enabling the seat to be moved along the longitudinal axis of the rails 52 either toward or away from the slot machine 20 to a comfortable position for the patron.

after which the patron releases the actuation handle in order to interengage and lock the tabs 64 in the slots 76.

Figure 6:
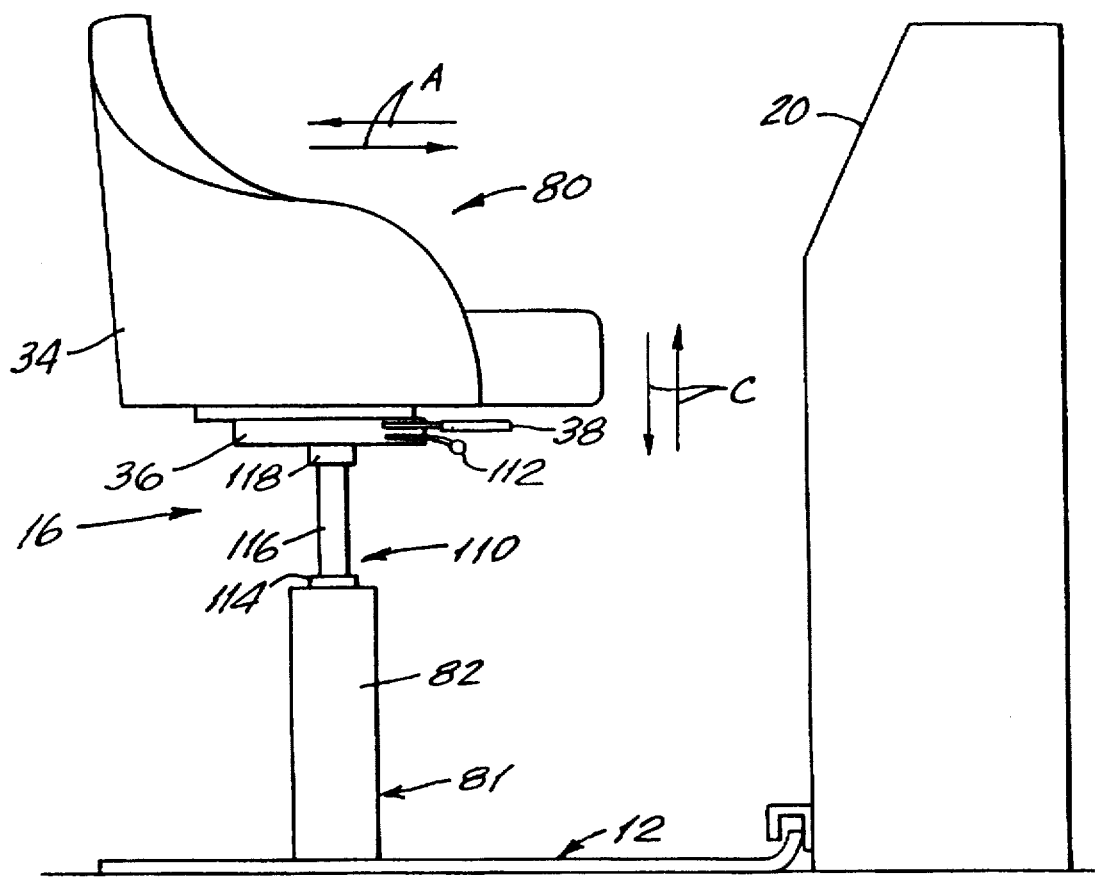
FIG. 6 is a side elevational view of a second embodiment of the adjustable game stool assembly of the subject invention as detachably attached to the slot machine and with manual operable means for movement toward and away from the game machine as well as for up and down movement of the seat.

Turning to FIG. 6, a second embodiment of the adjustable game stool assembly is illustrated and is generally designated by the reference numeral 80. In this embodiment the adjustable seat assembly includes a cylindrical post assembly 81 rigidly connected to base 12. The post assembly 81 supports an adjustable elevating mechanism 110 which, in turn, is connected to the seat 34 through an adjustable support mechanism 36.

Figure 7:
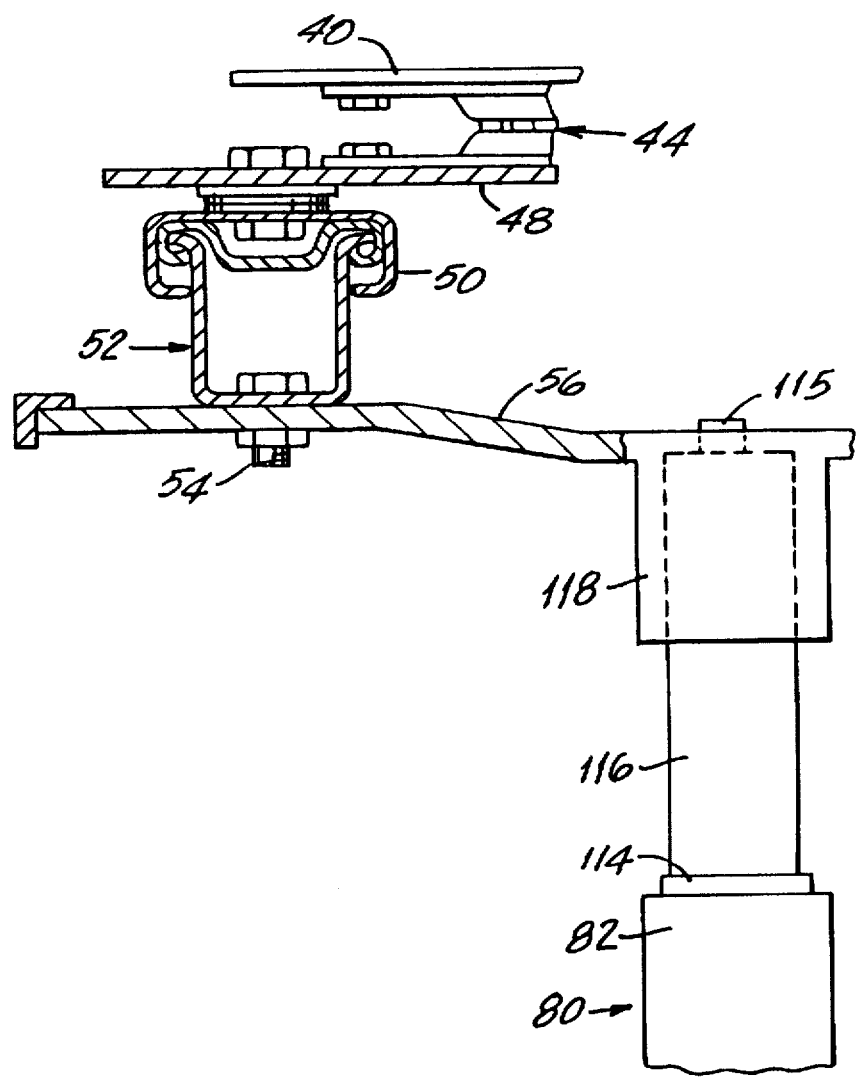
FIG. 7 is an elevational view, partially in section, of the column and the seat connection of the assembly illustrated in FIG. 6.
Figure 8:
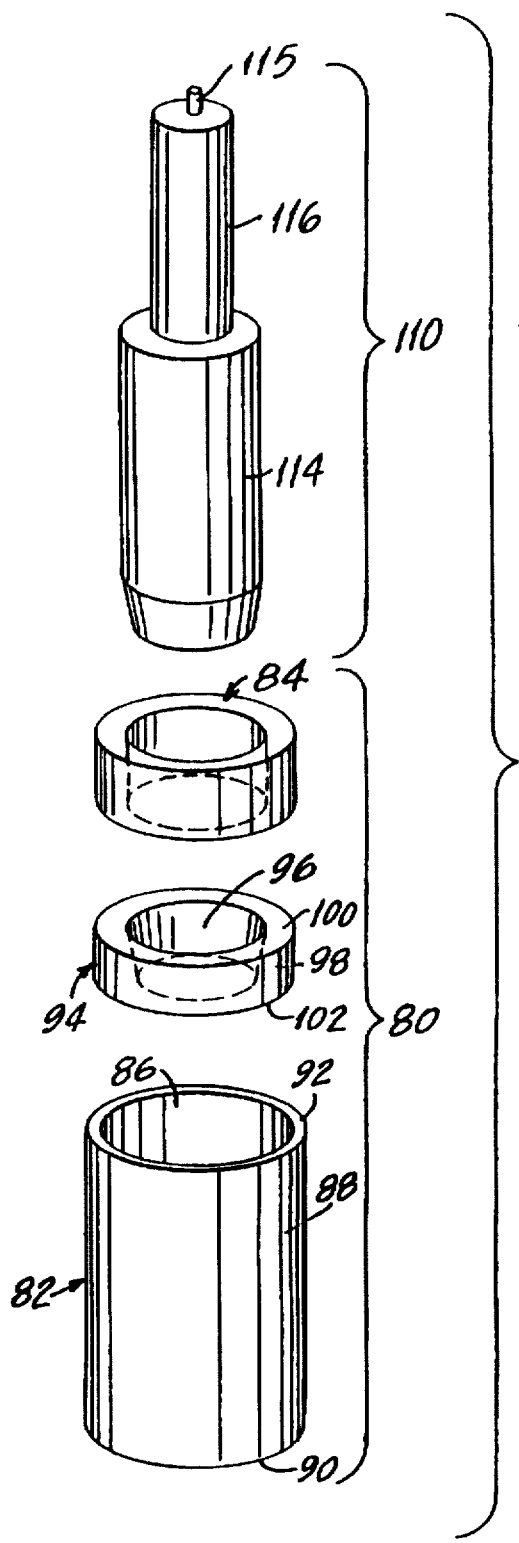
FIG. 8 is an exploded view, partially in section, of the adjustable raising mechanism and the post assembly of the embodiment of FIG. 6.
Figure 9:
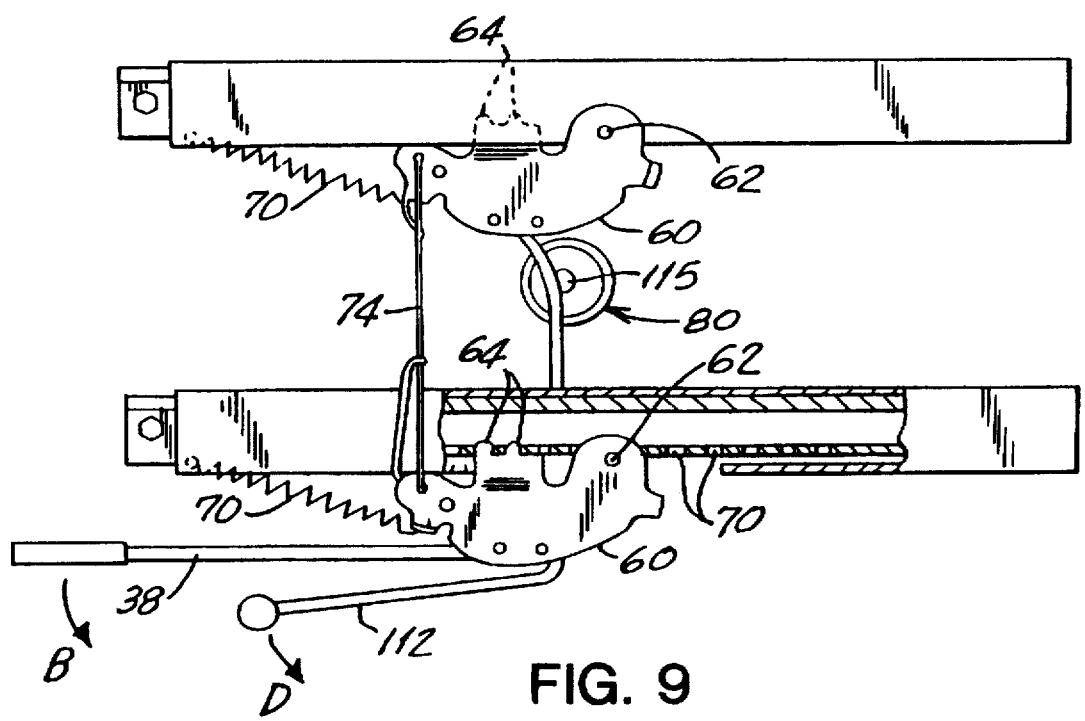
FIG. 9 is a plan view, partially in section, of the actuating portion of the adjustable seat support mechanism and the adjustable raising mechanism of the embodiment of FIG. 6.

The adjustable elevating mechanism 110 is shown in greater detail in FIGS. 7, 8 and 9, and enables the patron to manually effect vertical movement of the seat for height adjustment in the direction as indicated by the arrows "C" in FIG. 6. This vertical adjustment of the seat allows patrons of various heights to play the slot machine over extended periods of time in comfort and with minimum fatigue. As more fully described hereinafter, in order to adjust the position of the seat 34, the patron manually actuates a control handle 112 forming a portion of the adjustable elevating mechanism 110 and by either applying or removing his or her body weight, the seat 34 moves either down or up to the desired position, after which the patron releases the handle 112 to lock the adjustable elevating mechanism 110, thereby fixing the position of the seat 34 relative to the base member 12.

Turning to FIG. 7, the adjustable seat support mechanism 36 of the subject invention includes a plate 40 which is rigidly connected to the undersurface of the seat 34 by suitable bolts 42, and the plate 40 forms a portion of a self-centering swivel mechanism 44 in order to enable the seat 34 to be swiveled about the vertical axis of the post assembly 80. In turn, the swivel mechanism 44 is rigidly connected by bolts 46 to the seat header plate 48. Bolts 46 also connect the seat header plate 48 to slidable rails 50, two of which are provided as part of the adjustable seat support mechanism 36. The rails 50 are disposed in parallel relationship, as shown in FIG. 2. Each slidable rail 50, in turn, is slidably mounted on a fixed U-shaped support rail structure 52, and each slidable rail 50 cooperates with the associated fixed support rail 52 to enable sliding movement of the seat 34 toward and away from the slot machine 20 in the direction as shown by the arrows "A" in FIG. 1. Each fixed rail 52 is, in turn, connected by bolts 54 to the post header plate 56 of the adjustable raising mechanism 110.

Figure 8A:
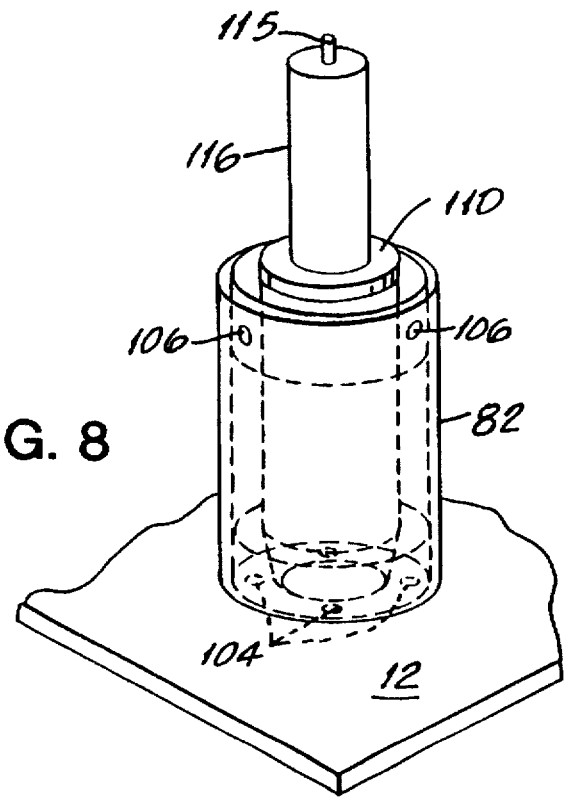
FIG. 8A is a perspective view, partially in section, of the adjustable raising mechanism and the post assembly of the embodiment of FIG. 6.

As illustrated in FIGS. 7, 8 and 8A, the adjustable elevating mechanism 110 includes a gas cylinder 114 which is frictionally force fitted within the cylindrical post assembly 80, and is slidably engaged with a gas cylinder rod 116 to enable vertical movement of the seat 34. In turn, the gas cylinder rod 116 is fixedly connected to the cylindrical sleeve 118 of the post header plate 56, as shown in FIG. 7.

The cylindrical post assembly 80 is shown in greater detail in FIGS. 8 and 8A, and is operative to support the adjustable elevating mechanism 110, and is fixedly connected to the base member 12. Post assembly 80 includes an outer cylindrical post 82 which is fixedly connected to the base member 12, and has a radial inner surface 86 and a radial outer surface 88. The outer cylindrical post 82 has a distal end 90 and a proximal end 92, with the distal end 90 being fixedly mounted to the base member 12. The proximal end 92 is open to accept the gas cylinder 114 of the adjustable elevating mechanism 110. An inner cylindrical post 94 is located at the distal end 90 of the outer cylindrical post 82, as shown in FIG. 8, and has a distal end 102 and a proximal end 100. The distal end 102 of the inner cylindrical post 94 is fixedly connected to the base member 12 by suitable bolts 104 which extend through the base member 12. The inner cylindrical post 94 also has a radial inner surface 96 and a radial outer surface 98. The radial inner surface 96 tapers off from a maximum radius at its proximal end 100 to a minimum radius at its distal end 102. By virtue of this taper the inner cylindrical post 94 frictionally engages the gas cylinder 114 of the adjustable elevating mechanism 110. The post assembly 80 also includes a spacer ring 84 that is fixedly mounted to its proximal end 92 through bolts 106. The spacer ring 84 maintains the gas cylinder 114 of the adjustable elevating mechanism 110 at a fixed distance from the radial inner surface 86 of the outer cylindrical post 82.

The adjustable elevating mechanism 110 also includes a manually operable actuating system for enabling adjustment of the seat 34 and sliding of the gas cylinder rod 116 relative to the fixed gas cylinder 114. The system includes the actuating handle 112 (see FIG. 9) which is operably connected to a toggle button 115 of the gas cylinder rod 116 and pivotally connected to the post header plate 56. In order to move the seat 34 either vertically up or down the patron merely actuates the handle 112 in either of the directions indicated by the arrow "D" (see FIG. 9) thereby actuating the gas cylinder rod through toggling the button 115 and enabling the seat 34, mounting mechanism 36 and gas cylinder rod 116 to be moved along the longitudinal axis of the gas cylinder 114 either vertically up or down to a comfortable position for the patron. Thereafter, the patron releases the handle 112 in order to lock the gas cylinder rod 116 in a fixed position.

By virtue of the self-centering swivel mechanism 44, as shown in FIG. 7, the patron is thus afforded freedom of swiveling the seat about the vertical axis of the post assembly 80, in addition to moving the seat 34 longitudinally along the axis of the plate 12, and being capable of raising or lowering the seat 34 to achieve a comfortable position for playing of the slot machine.

Accordingly there is provided a new and improved adjustable casino stool assembly which uniquely provides the person playing the slot machine with the capability of manually moving the seat either closer to or further away from the slot machine and either vertically up or down for maximum comfort. Manual adjustment of the seat is quickly and easily accomplished by the patron, and merely requires actuation of the readily available handles 38 and 112. In the locked position, the seat is fixed and stable, and provides maximum comfort for the patron.

Figure 10:
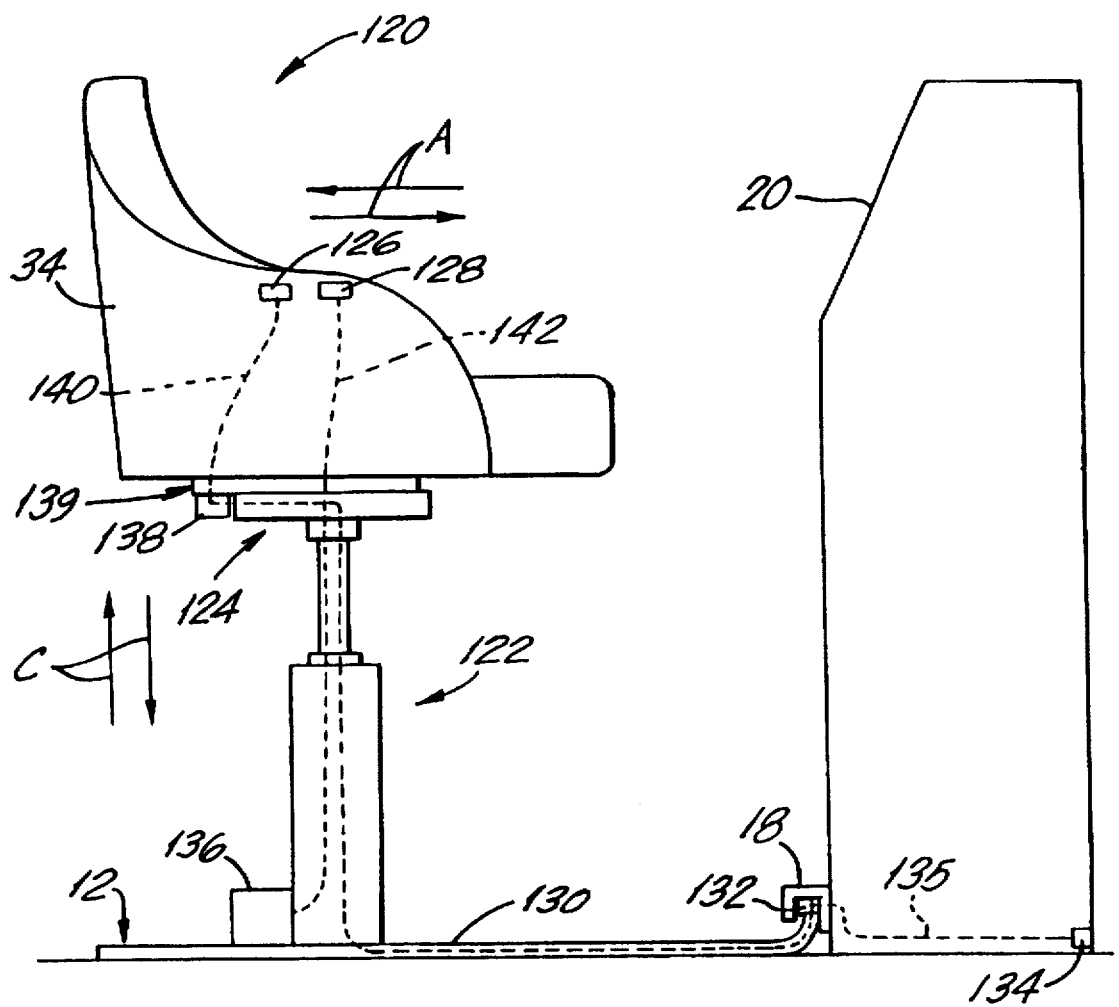
FIG. 10 is a side elevational view of a third embodiment of the adjustable game stool assembly of the subject invention.

Turning to FIG. 10, a third embodiment of the adjustable game stool assembly of the subject invention is illustrated and is generally designated by the reference numeral 120. The adjustable assembly 120 basically comprises a cushioned seat 34 which is supported by an electrically powered mounting assembly 124 which is, in turn, supported by an electrically powered post assembly 122 that is fixedly connected to the elongated base member 12.

The powered mounting assembly 124 enables the patron playing the slot machine to electrically actuate, with little exertion, movement of the seat 34 either toward or away from the slot machine 20 in the direction as indicated by the arrows "A" in FIG. 10 so as to move the seat closer to or further away from the slot machine to a comfortable position. Moreover, the patron can easily accomplish said adjustment by simply toggling a switch 126 mounted adjacent a side arm of the seat 34.

As seen in FIG. 10, the powered mounting assembly 124 includes an electrical motor 138 which is operably connected to the sliding rail assembly 139 to enable sliding movement of the seat 34 toward and away from the slot machine 20 in the directions shown by arrows "A". The powered mounting assembly 124 also includes an electrical actuating switch 126 and a lead 140 that electrically connects the switch 126 to the motor 138.

The powered post assembly 122 enables the patron playing the slot machine to electrically actuate, with little exertion, movement of the seat 34 either vertically up or down in the direction as indicated by the arrows "C" so as to move the seat to a comfortable position in order to enable patrons of various heights to play the slot machine over an extended period of time in comfort and with minimum fatigue. Moreover, the patron can easily accomplish said adjustment by simply toggling a switch 128 connected by lead 142 to motor 136.

The electric motor 136 is operably connected to an adjustable elevating mechanism 137 to enable sliding movement of the seat 34 vertically up or down in the direction as shown by the arrows "C".

The electric power to actuate both the mounting electrical motor 138 and the elevating electrical motor 136 is supplied through the electrical lead 130 that is attached to both the motors 136 and 138, as well as to an electrical connection 132. The electrical connection 132 is located at the upturned portion 14 of the base member 12 and electrically connects the portion of the lead 130 located at the upturned portion 14 of the base member 12 to appropriate circuitry 135 located at the rigid support member 18. The electrical connection 132 could be any standard electrical connection means such as male/female type connectors. The circuitry 135 located at the rigid support member 18 is electrically connected to the slot machine's power supply 134.

Accordingly there is provided a new and improved adjustable casino stool assembly which uniquely provides the person playing the slot machine with the capability of remotely moving the seat either closer to or further away from the slot machine and moving the seat either up or down for maximum comfort. Mode adjustment of the seat is quickly and easily accomplished by the patron, and merely requires actuation of the readily available switches 126 and 128.

Figure 11:
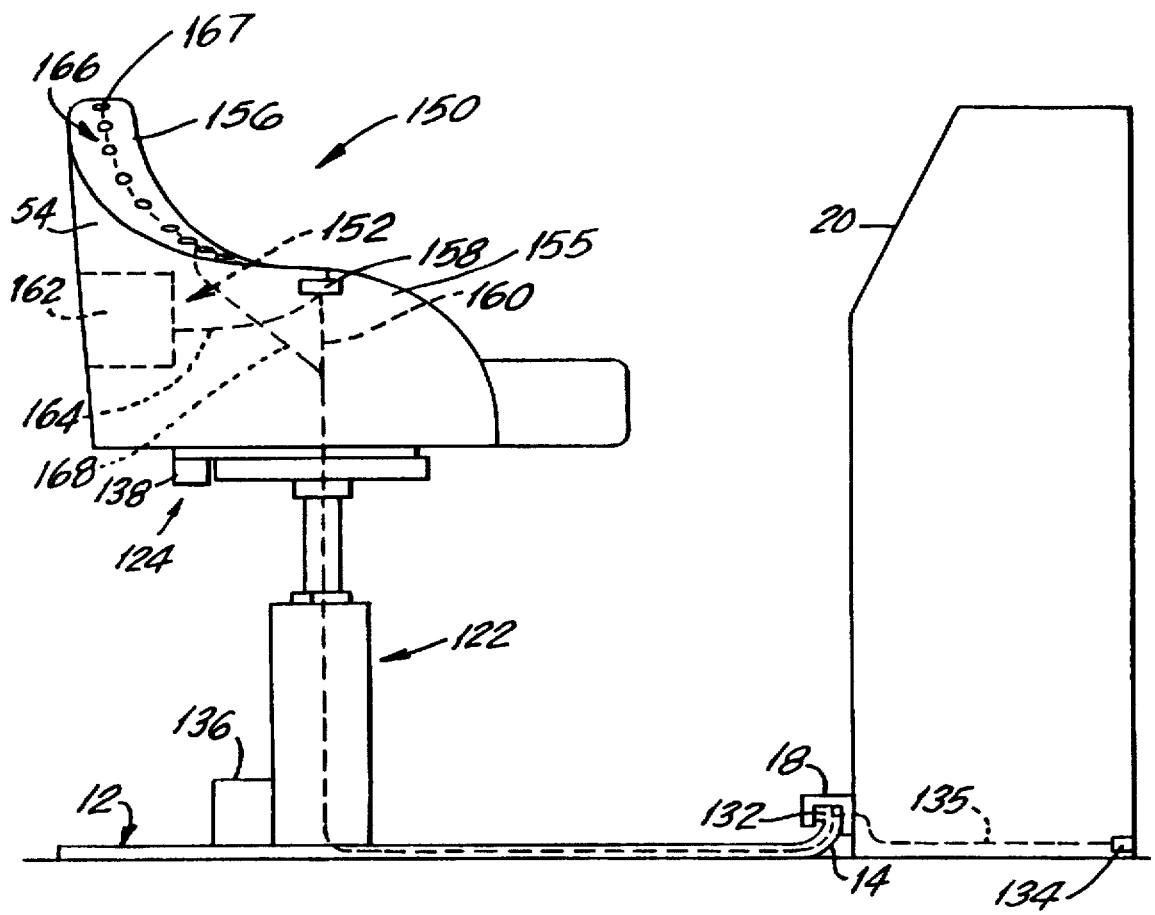
FIG. 11 is a side elevational view of a fourth embodiment of the adjustable game stool assembly of the subject invention.

Turning to FIG. 11, the fourth embodiment of the adjustable game stool assembly is illustrated and is generally designated by the reference numeral 150. In this embodiment, the adjustable seat assembly 150 includes an electrical light configuration which is mounted on a vibrating seat assembly 152 which is supported by an electrically powered mounting assembly 124 which is, in turn, supported by an electrically powered post assembly 122 that is fixedly connected to the elongated base member 12.

The vibrating seat assembly 152 enables the patron who experiences back fatigue while playing the slot machine to electrically actuate, with little exertion, vibration of the back portion 156 of the seat 154 so as to relieve the portion of the patron's back which is in contact with the back portion 156 of the seat 154. Moreover, the patron can easily accomplish said vibration by simply toggling a switch 158 mounted adjacent to the side arm 155 of the seat 154.

As seen in FIG. 11, the vibrating seat assembly 152 includes a seat 154 having a back portion 156. The vibrating seat assembly 152 also includes an electrical vibrator 162 which is operably connected to the back portion 156 of the seat 154 to enable vibration of the back portion 156 of the seat 154. The vibrating seat assembly also includes an electrical actuating switch 158 and a lead 164 that connects the switch 158 to the vibrator 162.

The electrical light configuration 166 attracts a potential patron to the gaming machine through electrical lights 167 which may be either continuously on or blinking on and off.

As seen in FIG. 11, the electrical light configuration 166 includes electrical lights 167 which are mounted on the back portion 156 and arms 155 of the seat 154. The electrical light configuration 166 also includes leads 168 which connect the electrical lights 167 to each other and to the electric lead 160.

The electrical power to actuate the electrical vibrator 162 and electrical light configuration 166 is supplied through the electrical lead 160 that is attached to the electrical vibrator switch 158 and electrical lead 168 as well as to an electrical connection 132. The electrical lead 160 could be connected to a suitable rechargeable battery network before connecting to the electrical connector 132. The rechargeable battery network would operate at a low voltage and deliver a low current to the electrical vibrator 162 and electrical light configuration 166, thereby ensuring safe operation of the game stool assembly and placing the patron at no risk. The electrical connection 132 is located at the upturned portion 14 of the base member 12 and electrically connects the portion of the lead 160 located at the upturned portion 14 of the base member 12 to the appropriate circuitry 135 located at the rigid support member 18. The electrical connection 132 could be any standard electrical connection means such as male/female type connectors. The circuitry 135 located at the rigid support member 18 is electrically connected to the slot machine's 20 power supply 134.

Figure 12:
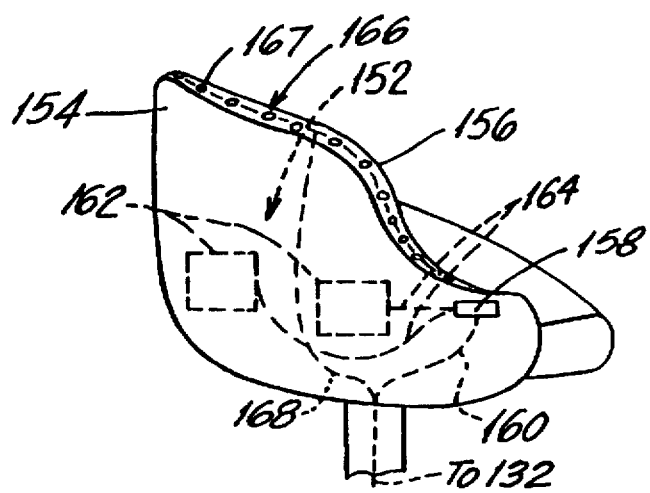
FIG. 12 is an elevational view of the fourth embodiment of the adjustable game stool assembly with two vibrators.

As illustrated in FIG. 12, the vibrating seat assembly 152 could include two electrical vibrators 162 when the seat 154 is an overlarge seat as found on high wager gaming machines. The electrical vibrators 162 are operably connected to the back portion 156 of the overlarge seat 154 to enable vibrating the back portion 156 of the overlarge seat 154. The electrical vibrators 162 are connected to an electrical actuating switch 158 through electrical leads 164. The electrical power to actuate the electrical vibrators 162 is supplied through the electrical lead 160 that is attached to the electrical vibration switch 158 as well as to the electrical connection 132 located at the upturned portion 14 of the base member 12.

Accordingly, there is provided a new and improved adjustable casino assembly which uniquely provides the person playing the slot machine with the capability of vibrating the back portion of the seat to soothe fatigued back muscles. Vibration of the back portion of the seat is easily accomplished by the patron, and merely requires actuation of the readily available switch 158.

Figure 13:
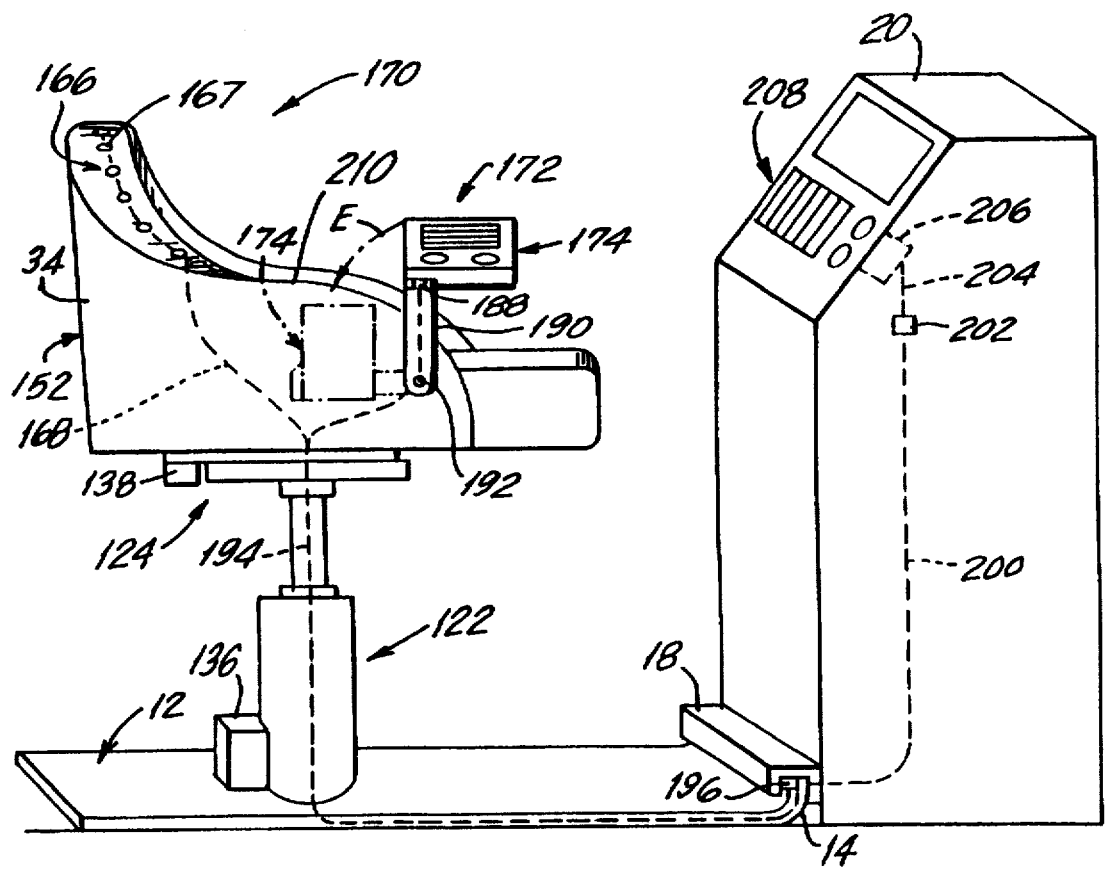
FIG. 13 is a side elevational view of a fifth embodiment of the adjustable game stool assembly of the subject invention as detachably attached to the slot machine and with a collapsible and retractable remote control configuration.

Turning to FIG. 13, a fifth embodiment of the adjustable game stool assembly is illustrated and is generally designated by the reference numeral 170. In this embodiment the adjustable seat assembly 170 includes a collapsible control configuration 172 which is movably connected to a vibrating seat assembly 152. An electrical light configuration 166 is mounted on the vibrating seat assembly 152. The vibrating seat assembly 152 is supported by a powered mounting assembly 124 which is, in turn, supported by an electrically powered post assembly 122 that is fixedly connected to the elongated base member 12.

Figure 14:
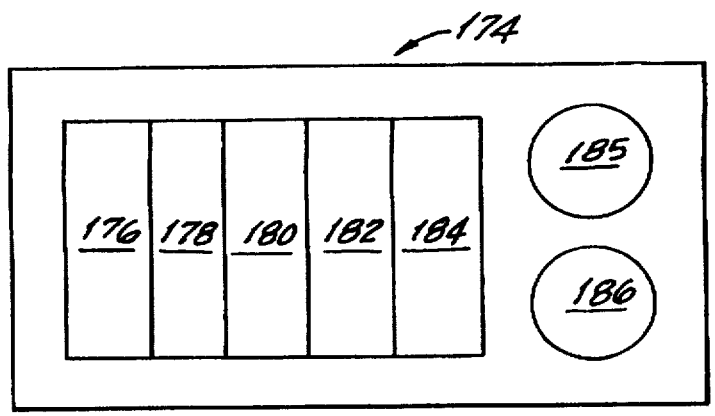
FIG. 14 is a plan view of the control pad of the collapsible remote control configuration of FIG. 13.

The collapsible control configuration 172 enables a patron who experiences discomfort when leaning out of his or her seat 34 when operating the gaming machine controls 208 to electrically actuate, with little exertion, operation of the gaming machine 20 so as to allow the patron to remain in a relaxed and comfortable sitting position. In particular, the patron simply utilizes the seat control pad 174, which is located at a position above the patron's lap, to operate the gaming machine 20. Moreover, the patron can easily accomplish such operation by simply utilizing the control pad keys (176–180) and buttons (185, 186) of the seat control pad 174 as illustrated in FIG. 14. Furthermore, the keys (176–180) and buttons (185, 186) of the seat control pad 174 are identical to the gaming machine controls 208.

As seen in FIG. 13, when the patron wishes to depart, he or she can collapse the collapsible control configuration 172 into its collapsed or retracted position as indicated by the arrow "E". In particular, the collapsible control configuration 172 of the subject invention includes a seat control pad 174 which is movably connected to an arm 190 through an appropriate connector 188. The connector 188 enables the control pad 174 to rotate into a vertical position above the arm 190 and then rotate to a collapsed position adjacent to the arm 190. The arm, in turn, is movably connected to the seat 34 through an appropriate connector 192. The connector 192 enables the collapsed pad 174 and arm 190 to rotate adjacent to the arm 210 of the seat 34 as indicated by the arrow "E" (see FIG. 13). In an alternate embodiment, the arm 190 could be hollow. As a result, the connector 192 would enable the collapsed pad 174 and arm 190 to retract to a position inside the arm 190.

The electrical path required for the control pad 174 of the collapsible control configuration 172 to actuate the gaming machine 20 is provided through the electrical lead 194. The electrical lead 194 is attached to the control pad 174, as well as the electrical connector 196. The electrical connector 196 is located at the upturned portion 14 of the base member 12 and electrically connects the portion of the lead 194 located at the upturned portion 14 of the base member 12 to the electrical lead 200 located at the rigid support member 18. The electrical connector 196 could be any standard electrical connector means such as male/female type connectors. The electrical lead 200 located at the rigid support member 18 is, in turn, connected to an internal connector 202. The internal connector 202 is located within the gaming machine 20 and electrically connects the electrical lead 200 to the control panel lead 204 of the gaming machine 20. The internal electrical connector 202 could by any standard electrical connector means such as male/female type connectors. The control panel lead 204 is, in turn, electrically connected to the appropriate circuitry 206 of the controls 208 of the gaming machine 20.

Accordingly, there is provided a new and improved adjustable game stool assembly which uniquely provides the person playing the slot machine with the capability of remotely operating the gaming machine. Operation of the gaming machine is quickly and easily accomplished by the patron, and merely requires actuation of the readily available keys (176–184) and buttons (185, 186) of the control pad 174 which are identical to the controls 208 of the gaming machine 20. Furthermore, the option to use the controls 208 of the gaming machine 20 is still available, and merely requires the patron to collapse the collapsible control configuration 172.

Figure 15:
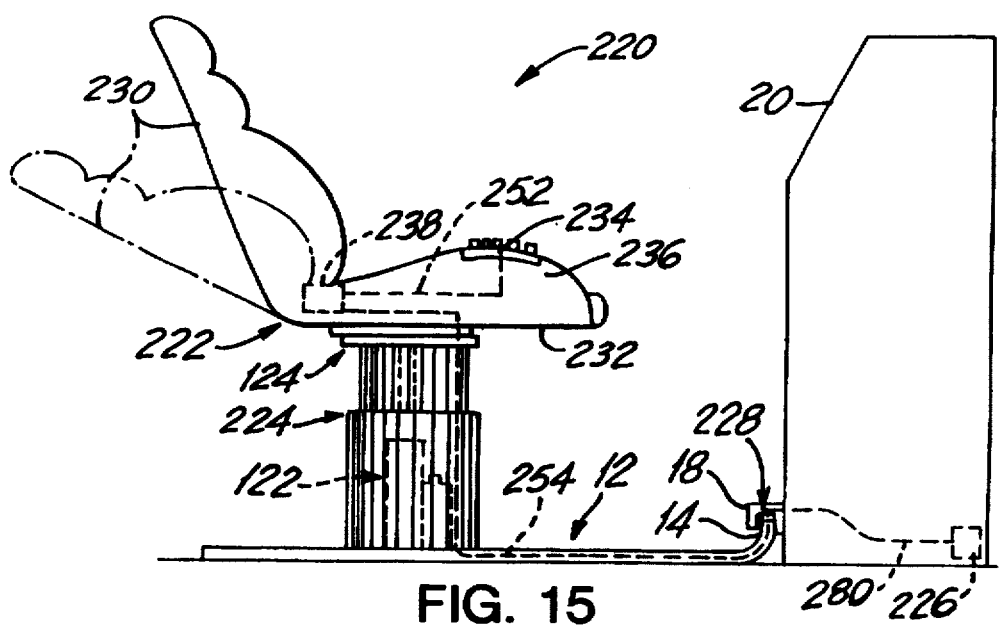
FIG. 15 is a side elevational view of a sixth embodiment of the adjustable game stool assembly of the subject invention as detachably attached to the slot machine and with a tiltable seat assembly.

Turning to FIG. 15, the sixth embodiment of the adjustable game stool assembly is illustrated and is generally designated by the reference numeral 220. In this embodiment the adjustable game stool assembly 220 includes a tiltable seat assembly 222 which is supported by a powered mounting assembly 124 which is, in turn, supported by a powered post assembly 122 that is fixedly connected to the elongated base member 12. Additionally, the adjustable game stool assembly 220 includes an aesthetic post housing 224 which surrounds the powered post assembly 122 and is fixedly mounted to the elongated base member 12 and connected to the powered mounting assembly 124. Electrical power is supplied to the tiltable seat assembly 222, powered mounting assembly 124, and powered post assembly 122 from the power source 226 of the gaming machine 20 through a detachable connector configuration 228 located adjacent the upturned portion 14 of the elongated base 12.

The tiltable seat assembly 222 enables a patron who desires to sit in a reclined position to electrically actuate, with little exertion, angular tilting of the back portion 230 of the seat assembly 222 with respect to the base portion 232 of the seat assembly 222 as illustrated in FIG. 15. Moreover, the patron can easily accomplish the angular tilting by simply toggling a switch 234 mounted adjacent a side arm 236 of the seat assembly 222.

Figure 16:
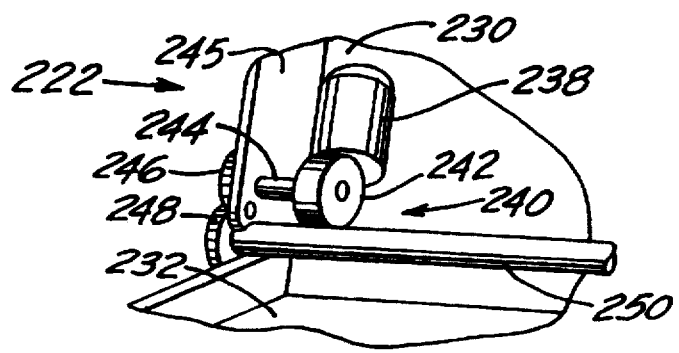
FIG. 16 is a perspective view of the tilting means of the sixth embodiment of the subject invention.

As seen in FIG. 16, the tiltable seat assembly 222 includes an electrical motor 238 which is fixed to the back portion 230 of the seat assembly 222 and is operably connected to a gear train 240 to enable tilting of the back portion 230 of the seat assembly 222. In particular, the gear train 240 includes a driving gear 242 which is operably connected to the electrical motor 238 and is fixedly connected to an axle 244. In turn, the axle 244 extends through a side wall 245 of the back portion 230 of the seat assembly 222 and is fixedly connected to an intermediate gear 246 which, in turn, engages a corresponding pivot axis gear 248. The pivot axis gear 248 is fixedly connected to a pivot axis axle 250 which interconnects the back portion 230 and the base portion 232 of the seat assembly 222 and allows the back portion 230 to tilt with respect to the base portion 232 of the seat assembly 222.

As seen in FIG. 15, the electrical motor 238 is connected to an electrical actuating switch 234 through an electrical lead 252. The electrical power to actuate the electrical motor 238 is supplied through the electrical lead 254 that interconnects the electrical motor 238 and the detachable connector configuration 228 located at the upturned portion 14 of the base member 12.

Accordingly, there is provided a new and improved adjustable game stool assembly which uniquely provides a person playing the slot machine with the capability of tilting the back portion of the seat so as to recline the seat into a comfortable position. Tilting of the back portion of the seat is easily accomplished by the patron, and merely requires actuation of the readily available switch 234.

The aesthetic post housing 224 shields the aesthetically unappealing powered post assembly 122 from the view of a potential patron.

Figure 17:
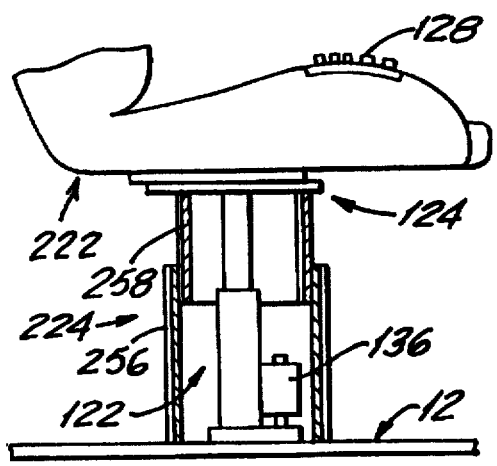
FIG. 17 is a side elevational view, partially in section, of the seventh embodiment of the subject invention with the seat raised.
Figure 18:
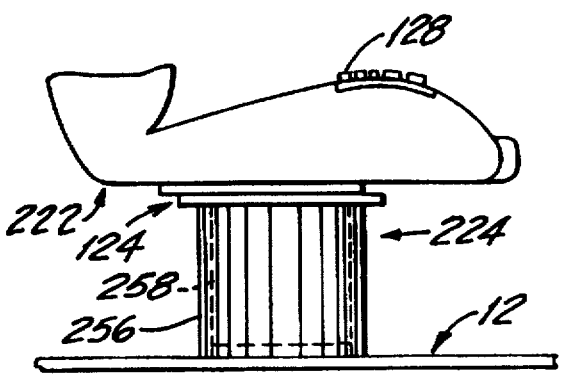
FIG. 18 is a side elevational view of the seventh embodiment of the subject invention with the seat lowered.

As seen in FIGS. 17 and 18, the aesthetic post housing 224 includes an outer cylinder 256 and an inner cylinder 258 which surround the post assembly 122 and, thereby, shield the powered post assembly 122 from the view of potential patrons. The outer cylinder 256 is fixed to the elongated base member 12 and is adapted to slidably engage and telescopingly mate with the inner cylinder 258 which is connected to the powered mounting assembly 124.

As shown in FIGS. 17 and 18, the aesthetic post housing shields the powered post assembly 122 from view as a patron toggles switch 128 to move the tiltable seat assembly 222 vertically up or down. In particular, as seen in FIG. 17, the inner cylinder 258 projects beyond the outer cylinder 256 as the patron vertically raises the tiltable seat assembly 222 up and, as seen in FIG. 18, the inner cylinder 258 recedes within the outer cylinder 256 as the patron vertically lowers the tiltable seat assembly down towards the desired height.

Accordingly, there is provided a new and improved adjustable game stool assembly which uniquely shields aesthetically unappealing elevation mechanics from the view of a patron. Shielding of the elevation mechanics is accomplished through an aesthetic post housing 224 which ensures that casino patrons cannot view the elevation mechanics as the seated patron adjusts the game stool seat vertically up and down.

The detachable connector configuration 228 provides an easily engageable and disengageable electrical connection between the game stool assembly 220 and the gaming machine 20. In addition the detachable connection configuration 228 provides an enhanced electrical connection between the game stool assembly 220 and the gaming machine 20 through a wiping action that removes residue at the contact points of the wiping connector configuration 228.

As seen in FIGS. 19–22, the detachable connector configuration 228 includes a first connector 260 fixed within the engagement channel 261 of the rigid support member 18 and a second connector 262 which is fixed within a notched region 264 of the upturned portion 14 of the elongated base member 12.

As illustrated in FIGS. 19 and 20, the first connector 260 of the detachable connector configuration 228 comprises a generally rectangular non-conductive housing 266 having an upper surface 268 and a lower surface 270. The upper surface 268 of the first connector 260 is fixed to the rigid support member 18. The lower surface 270 of the first connector 260 has a plurality of downwardly projecting resilient cantilevered V-shaped arms 272. Each conductive V-shaped arm 272 has a first end 274 fixedly mounted within the housing 266 of the first connector 260 and a second end 276 slidably engaged with the housing 266 through the lower surface 270 thereof. The apex of the V in each V-shaped arm 272 defines an intermediate projecting contact point 278. Each V-shaped arm 272 is electrically connected to the power supply 226 of the game machine 20 through the lead 280.

As illustrated in FIG. 21, the second connector 262 comprises a generally rectangular non-conductive housing 282 fixed within the notched region 264 of the upturned portion 14 of the elongated base member 12. The housing 282 has an upper surface 284, a lower surface 286 and opposed side walls 288, 290. The lower surface 286 of the housing 282 of the second connector 262 is fixed within the notched region 264 of the upturned portion 14 of the elongated base member 12. The upper surface 284 and side wall 288 have a plurality of recesses 292 having L-shaped cross-sections. Each recess 292 exposes a base contact 294. Each base contact 294 is electrically connected to the electric motors and switches of the powered post assembly, powered mounting assembly, and angular tilting assembly of the tiltable game stool assembly 220 through the electrical lead 254.

The detachable connector configuration 228 provides an easily engageable and disengageable electrical connection between the tiltable game stool assembly 220 and the game machine 20. The electric connection is established when the upturned portion 14 of the elongated base member 12 engages the rigid support member 18 of the game machine 20. In particular, the first connector 260 and second connector 262 of the detachable connector configuration 228 engage when the upturned portion 14 of the elongated base member 12 engages the rigid support member 18. As a result, each V-shaped arm 272 of the first connector 260 engages its corresponding recessed base contact 294 of the second connector 262. As the second connector 262 presses towards the first connector 260 the second end 276 of the V-shaped arm 272 of the first connector 260 recedes within the housing 266 of the first connector 260. As a result, the contact point 278 of the V-shaped arm 272 wipes across the corresponding recessed base contact 294 of the second connector 262 and scrapes away residue that has accumulated on the recessed base contact 294, thereby providing an enhanced electrical connection between the contact point 278 of the V-shaped arm 272 of the first connector 260 and the recessed base contact 294 of the second connector 262. The electrical connection between the first connector 260 and the second connector 262 is easily disengaged by simply detaching the upturned portion 14 of the tiltable game stool assembly 220 from the rigid support member 14 of the game machine 20.

Accordingly, there is provided a new and improved adjustable game stool assembly which uniquely allows the game stool assembly to draw power from an engaged gaming machine through a detachable connector configuration. Enhanced electrical connection is provided between the game stool assembly and gaming machine through the upper connector's 260 wiping of residue from the lower connector 262 as the upper connector 260 is brought into engagement with the lower connector 262.

Figure 23:
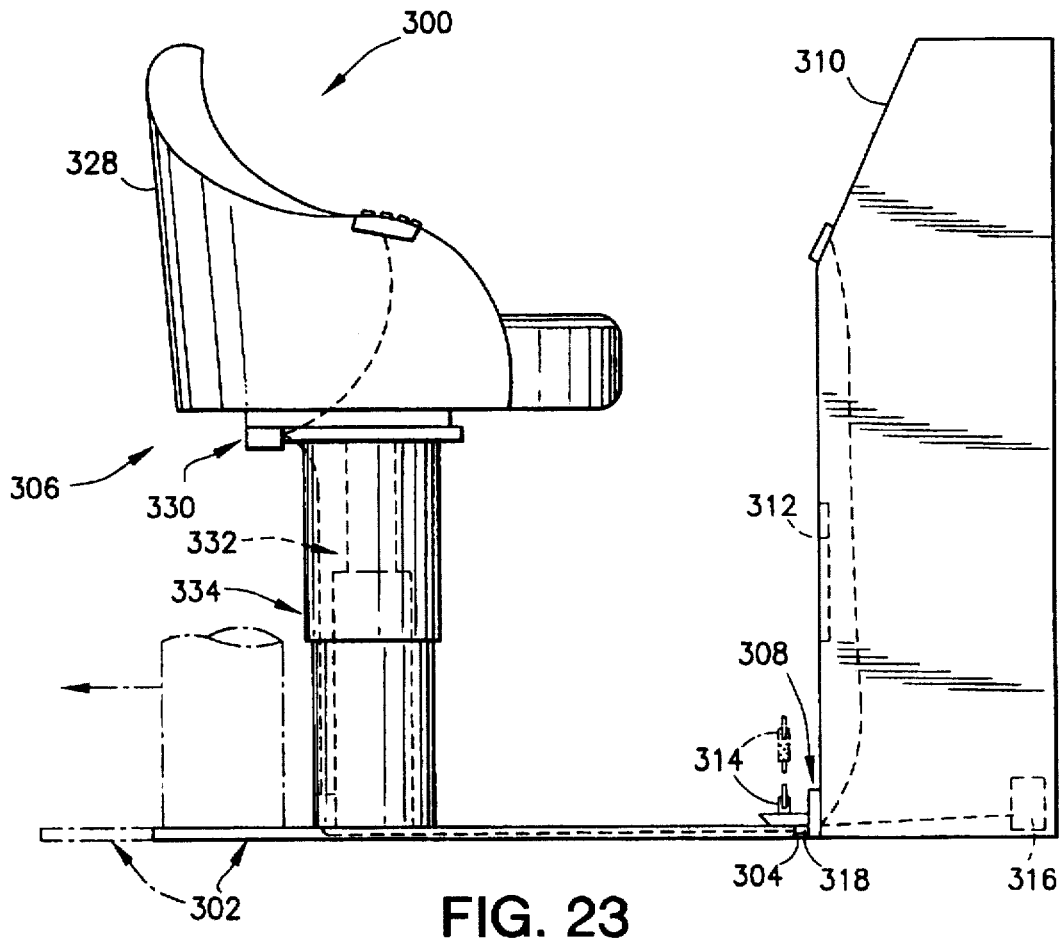
FIG. 23 is a side elevational view of a seventh embodiment of the adjustable game stool assembly of the subject invention as detachably attached to the slot machine.
Figure 24:
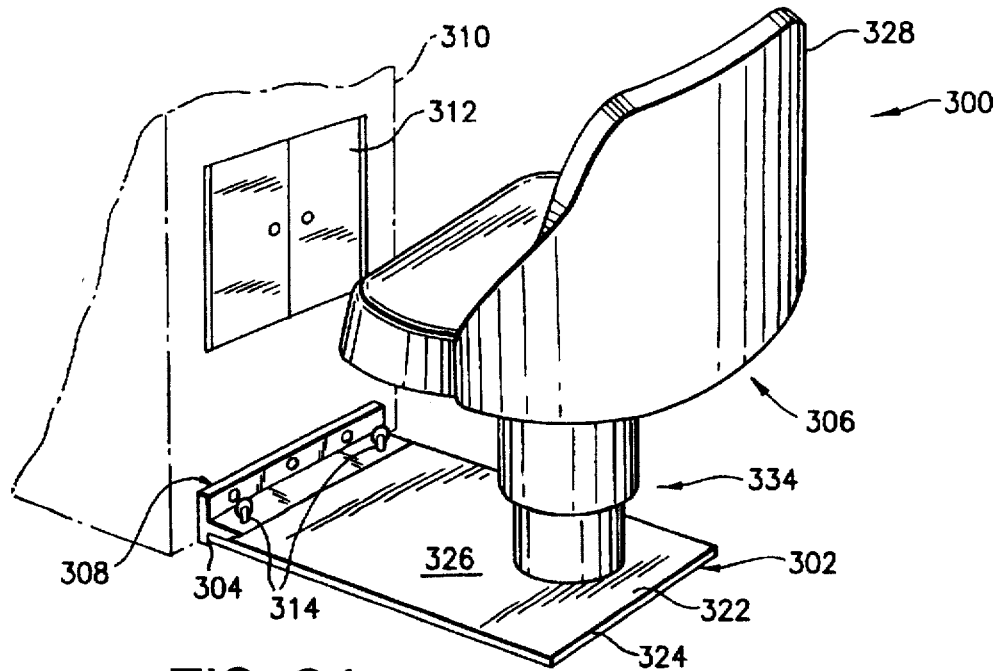
FIG. 24 is a perspective view of the seventh embodiment of the subject invention.

Turning to FIGS. 23 and 24, the seventh embodiment of the adjustable game stool assembly is illustrated and is generally designated by the reference numeral 300. The adjustable game stool assembly 300 of the subject invention basically comprises an extruded elongated flat base member 302 having a guided engagement portion 304 at one end, a powered chair configuration 306 extending from the base member 302 opposite the guiding engagement portion 304, a rigid support member 308 affixed to the base of a gaming machine 310 having a cash box 312, and a locking mechanism 314 interlocking the guided engagement portion 304 of the elongated base member 302 with the rigid support member 308. Electrical power is supplied to the power chair configuration 306 from the power source 316 of the gaming machine 310 through a detachable connector configuration 318 located adjacent the guided engagement portion 304 of the elongated base 302.

The guided engagement portion 304, rigid support member 308 and locking mechanism 314 arrangement enables an attendant, with little exertion, to access the cash box 312 of the gaming machine 310. As seen in FIG. 23, the attendant can gain access to the cash box 312 by actuating the locking mechanism 314 and disengaging the guided engagement portion 304 of the elongated base 302 from the rigid support member 308 by sliding the adjustable game stool assembly 300 away from the gaming machine 310.

The extruded base member 302 of the detachable game stool assembly 300 of the subject invention comprises an elongated flat portion 322 having a rear edge 324 and having an upper surface face 326. The base member 302 is formed with a guided engagement portion 304 opposite the rear edge 324. A powered seat configuration 306 is secured to the base member 302 adjacent the rear edge 324 thereof. The powered seat configuration 306 includes a seat 328 which is supported by a powered mounting assembly 330 which is, in turn, supported by a powered post assembly 332 that is fixedly connected to the elongated base member 302. Additionally, the powered seat configuration 306 includes an aesthetic telescopic post housing 334 which surrounds the powered post assembly 332 and is fixedly mounted to the elongated base member 302 and connected to the powered mounting assembly 330. Electrical power is supplied to the powered chair configuration 306 from the power source 316 of the gaming machine 310 through the detachable connector configuration 318.

Turning to FIGS. 25-28, a preferred embodiment of the elongated base member 302, rigid support member 308, and locking mechanism 314 arrangement is shown. The guided engagement portion 304 of the base member 302 comprises a distal edge 336, a first tapered recessed region 338 and a second tapered recessed region 340. Locking pin apertures 342 are provided adjacent the distal edge 336 of the guided engagement portion 304. A first connector 344 of the detachable connector configuration 318 is fixed within the second tapered recessed region 340 of the guided engagement portion 304 of the base member 302.

The rigid support member 308 comprises an elongated upstanding rear base portion 346 having a plurality of spaced apart bolt receiving apertures 348, and a cantilevered portion 350 having an upper surface 352, a lower surface 354, opposed side edges 356, 358 and a tapered front edge 360. The upstanding rear base portion 346 and the lower surface 354 of the cantilevered portion 350 form an engaging channel 362 having a L-shaped cross-section. A pair of threaded apertures 364 extend through the cantilevered portion 350 of the rigid support member 308 and are aligned to correspond with the locking pin apertures 342 disposed adjacent the distal edge 336 of the guided engagement portion 304 of the elongated base member 302 when the guided engagement portion 304 of the base member 302 is inserted within the engagement channel 362 of the rigid support member 308. Additionally, a pair of elongated stop members 366 and a pair of guide posts 367 extend downwardly from the lower surface 354 of the cantilevered portion 350. The elongated stop members 366 are aligned such that they correspond to the first recessed region 338 of the guided engagement portion 304 of the base member 302 when the guided engagement portion 304 of the base member 302 is inserted within the engagement channel 362 of the rigid support member 308. The guide posts 367 are aligned such that they correspond to the second recessed region 340 of the guided engagement portion 304 of the base member 302 when the guided engagement portion 304 of the base member 302 is inserted within the engagement channel 362 of the rigid support member 308. The second connector 368 of the detachable connector configuration 318 is fixed within the engaging channel 362 of the rigid support member 308 as will be further explained below.

Figure 25:
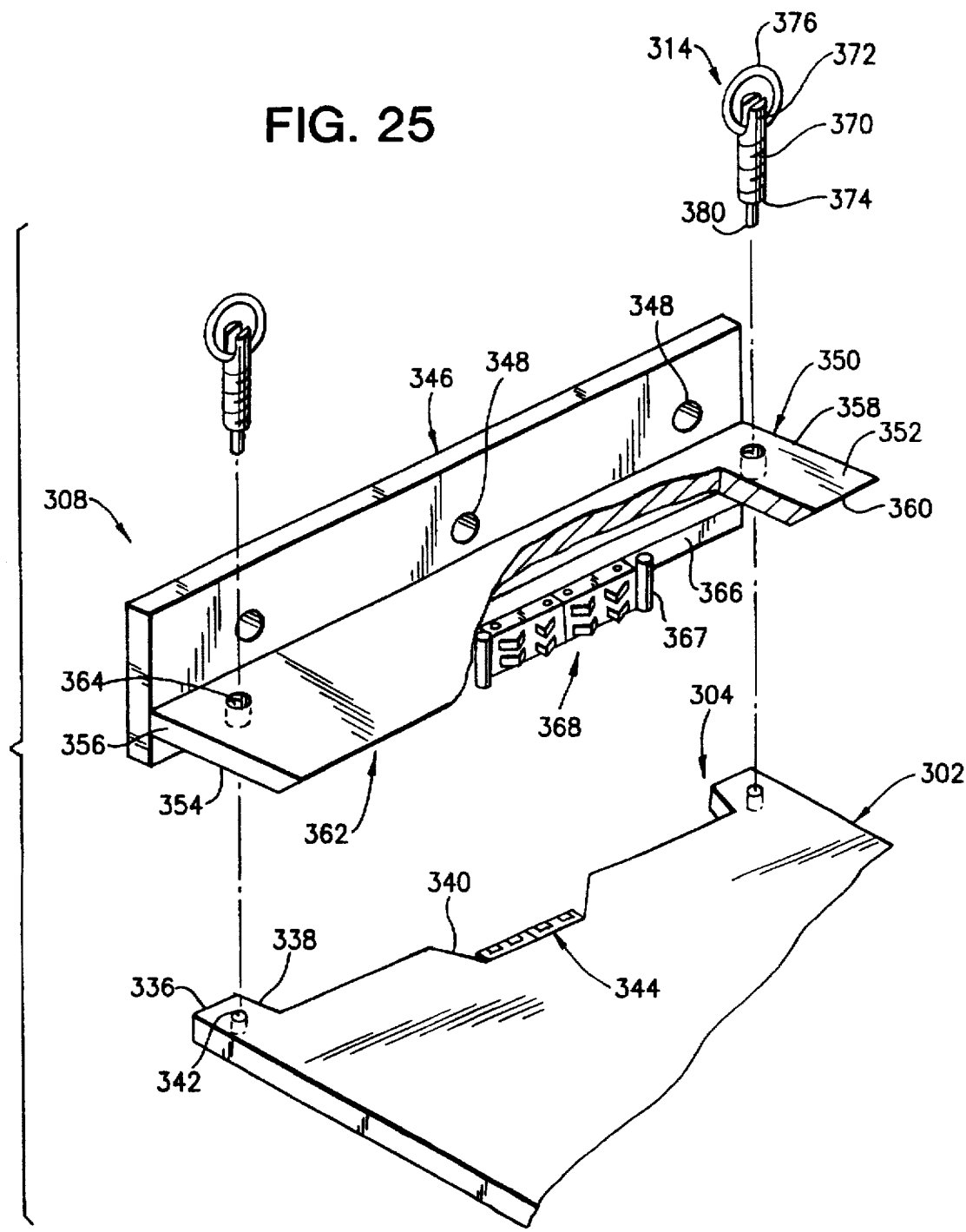
FIG. 25 is an exploded perspective view of the fixed support member, base member and locking mechanism of the seventh embodiment of the subject invention.
Figure 26:
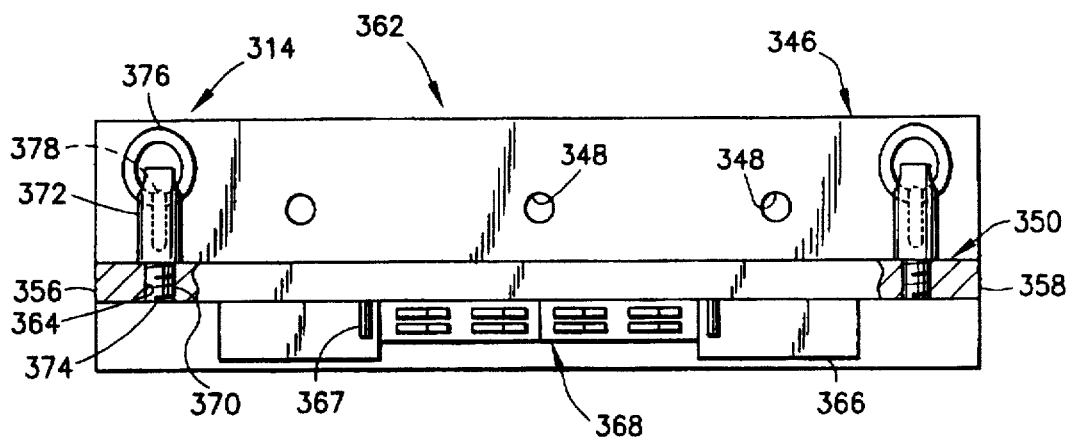
FIG. 26 is a front elevational view of the fixed support member and locking pin arrangement of the seventh embodiment of the subject invention.
Figure 27:
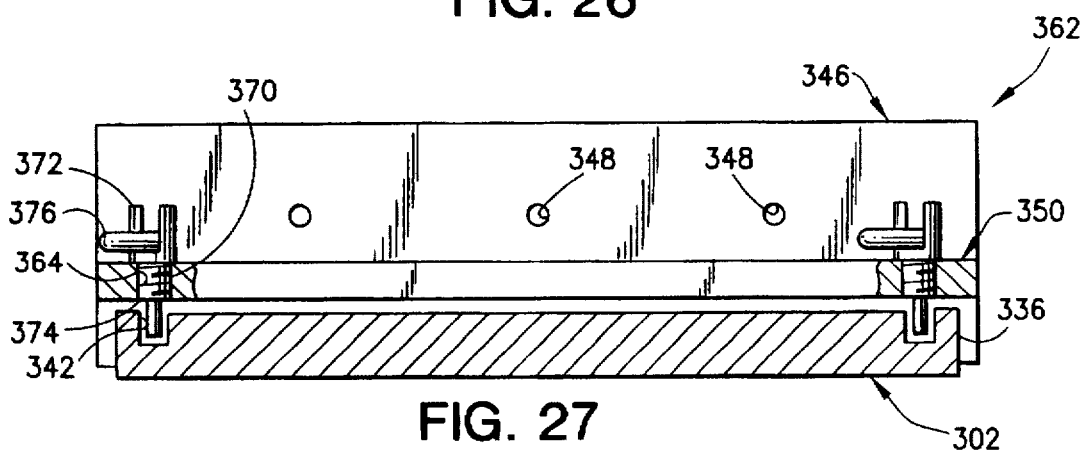
FIG. 27 is a front elevational view, partially in section, of the fixed support member, locking pin arrangement, and base member of the seventh embodiment of the subject invention.

The preferred locking mechanism 314 is shown in greater detail in FIGS. 25, 26 and 27, and enables an attendant to interlock the rigid support member 308 and the elongated base member 302, thereby preventing the game stool assembly 300 from accidentally being disengaged from the gaming machine 310 and detracting from the casino's aesthetically pleasing environment. The preferred locking mechanism comprises a plurality of locking pins 314. Each locking pin 314 includes a threaded cylindrical rod 370 having an actuating end 372 and an engagement end 374. A ring 376 is connected to a spring biased inner rod 378 adjacent the actuating end 372 of the locking pin 314. The inner rod 378 is slidably mounted within the cylindrical rod 370 and is operably connected to a locking tab 380 which is, in turn, slidably mounted within the cylindrical rods 378 and projects beyond the engagement end 374 thereof. As shown in FIG. 26, when the ring 376 is in the pulled position the locking tab 380 recedes within the cylindrical rod 370 until it is flush with the engagement end 374 thereof. As shown in FIG. 27, when the ring 376 is in the released position the locking tab 380 projects outwardly beyond the engagement end 374 of the cylindrical rod 370.

Referring to FIGS. 26 and 27, to install the adjustable game stool assembly 300 of the subject invention, the locking pins 314 are threaded into the threaded apertures 364 of the rigid support member 308. The actuating ring 376 of each locking pin 314 is pulled so that the spring biased locking tab 380 recedes within the cylindrical rod 370 to a position flush with the engagement end 374 of the cylindrical rod 370 of the locking pin 314. The guided engagement portion 304 of the elongated base member 302 is slidably inserted within the engagement channel 362 of the rigid support member 308. The cooperation of the elongated stop members 366 and guide posts 367 of the rigid support members 308 with the first tapered recessed region 338 and the second tapered recessed region 340 of the guided engagement portion 304 of the elongated base member 302 ensure that the threaded apertures 364 of the rigid support member 308 and the locking pins 314 engaged therein are aligned with the locking pin apertures 342 disposed adjacent the distal edge 336 of the guided engagement portion 304 of the inserted elongated base member 302. Afterwards, the actuating ring 376 of each locking pin 314 is released so that the spring biased locking tab 380 projects beyond the engagement end 374 of the cylindrical rod 370 and engages the aligned locking pin aperture 342 disposed adjacent the distal edge 336 of the guided engagement portion 304 of the inserted elongated base member 302. At such a time, the rigid support member 308 and the locking pins 314 prohibit the longitudinal and lateral movement of the guided engagement portion 304 of the elongated base member 302 relative to the base of the gaming machine 310 and accidental disengagement of the guided engagement portion 304 of the base member 302 from the engagement channel 362 of the rigid support member 308.

To release the game stool assembly 300 from the gaming machine 310, an attended merely pulls each actuating ring 376 of each locking pin 314 so that the spring biased locking tab 380 of each pin 314 recedes within the cylindrical rod 370 to a position flush with the engagement end 374 of each cylindrical rod 370 and then the attendant merely slidably disengages the guided engagement portion 304 of the elongated base member 302 from the engagement channel 362 of the rigid support member 308.

The detachable connector configuration 318 provides an easily engageable and disengageable electrical connection between the game stool assembly 300 and the gaming machine 310. In addition, the detachable connector configuration 318 provides an enhanced electrical connection between the game stool assembly 300 and the gaming machine 310 through a wiping action that removes residue at the contact points of the wiping connector configuration.

Figure 28:
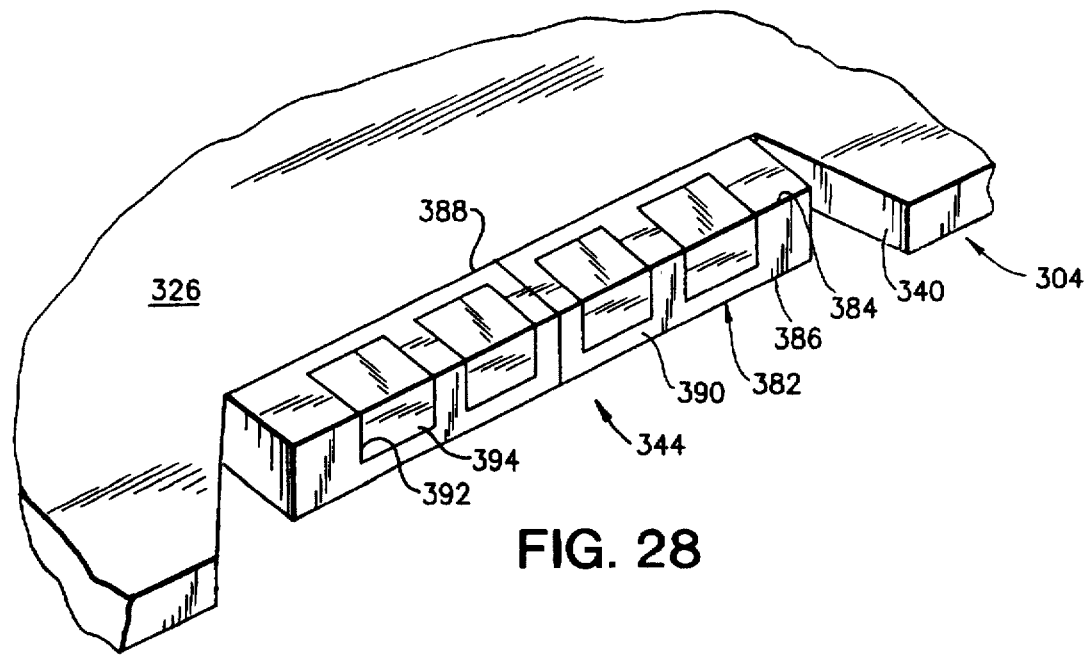
FIG. 28 is a perspective view, partially in section, of a portion of the seventh embodiment of the subject invention illustrating the first housing of the electrical connector assembly.
Figure 29:
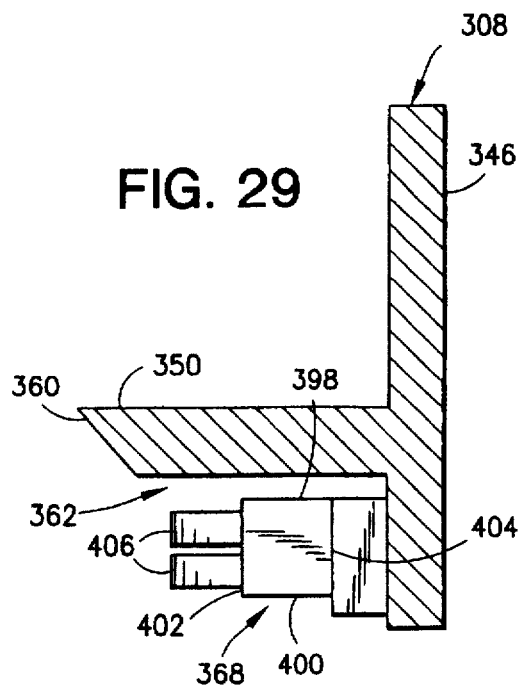
FIG. 29 is a side elevational view, partially in section of the seventh embodiment of the subject invention illustrating the second housing of the electrical connection assembly.
Figure 30:
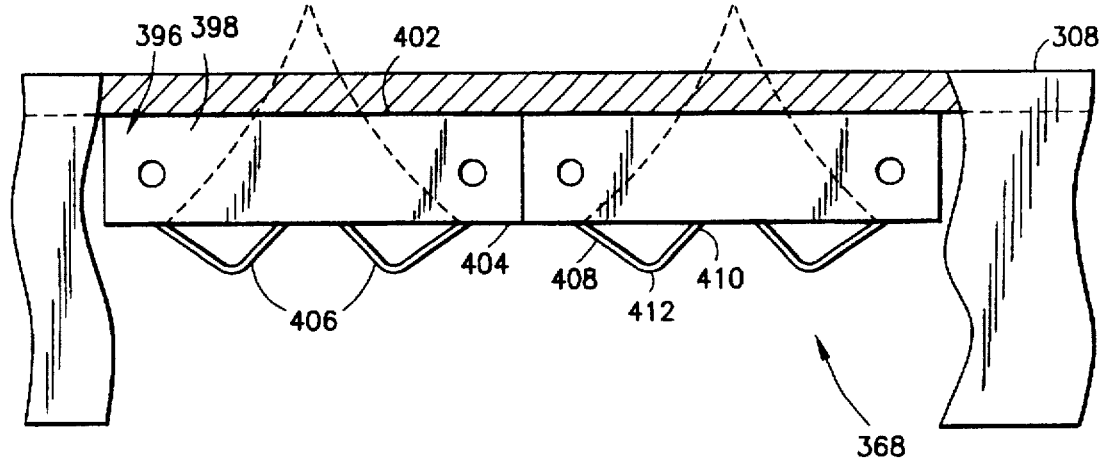
FIG. 30 is a plan view, partially in section, of the seventh embodiment of the subject invention illustrating the second housing of the electrical connection assembly.

As seen in FIGS. 28-30, the detachable connector configuration 318 includes a first connector 344 fixed within the second tapered recessed region 340 of the guided engagement portion 304 of the base member 302 and a second connector 368 which is fixed within the engaging channel 362 of the rigid support member 308.

As illustrated in FIG. 28, the first connector 344 comprises a generally rectangular non-conductive housing 382 fixed within the second tapered recessed region 340 of the guided engagement portion 304 of the elongated base member 302. The housing 382 has an upper surface 384, a lower surface 386 and opposed side walls 388, 390. One side wall 388 of the housing 382 of the first connector 344 is fixed within the second tapered recessed region 340 of the guided engagement portion 304 of the elongated base member 302. The opposing side wall 390 and upper surface 384 have a plurality of recesses 392 having L-shaped cross-sections. Each recess 392 exposes a base contact 394. Each base contact 394 is electrically connected to the electric motors and switches of the powered chair configuration 306.

As illustrated in FIGS. 29 and 30, the second connector 368 comprises a generally rectangular non-conductive housing 396 having an upper surface 398, a lower surface 400, and opposing side walls 402, 404. The upper surface 398 of the second connector 368 is fixed to the lower surface 354 of the cantilevered portion 350 of the rigid support member 308. One side wall 402 faces the elongated upstanding rear base portion 346 of the rigid support member 308. The other side wall 404 faces outwardly away from the base portion 346 of the rigid support member 308 and has a plurality of outwardly projecting resilient cantilevered V-shaped arms 406. Each conductive V-shaped arm 406 has a first end 408 fixedly mounted within the housing 396 of the second connector 368 and a second end 410 slidably engaged with the housing 396 through the side wall 404 thereof. The apex of the V in each V-shaped arm 406 defines an intermediate projecting contact point 412. The V-shaped arms 406 are connected to the power supply 316 and the game controls 320 of the gaming machine 310 through the leads 414, 416.

The detachable connector configuration 318 provides an easily engageable and disengageable electrical connection between the adjustable game stool assembly 300 and the gaming machine 310. The electrical connection is established when the guided engagement portion 304 of the elongated base 302 engages the rigid support member 308 attached to the gaming machine 310. In particular, the first connector 344 and the second connector 368 of the detachable connector configuration 318 engage when the guided engagement portion 304 of the elongated base member 302 engages the rigid support member 308. As a result, each V-shaped arm 406 of the second connector 368 engages its corresponding recessed base contact 394 of the first connector 344. As the first connector 344 presses towards the second connector 368 the second end 410 of the V-shaped arm 406 of the second connector 368 is received within the housing 396 of the second connector 368. As a result, the contact point 412 of the V-shaped arm 406 wipes across the corresponding recessed base contact 394 of the first connector 344 and scrapes away residue that has accumulated on the recessed base contact 394, thereby providing enhanced electrical connection between the contact point 412 of the V-shaped arm 406 of the second connector 368 and the recessed base contact 394 of the first connector 344. The electrical connection between the first connector 344 and the second connector 368 is easily disengaged by simply detaching the guided engagement portion 304 of the detachable game stool assembly 300 from the rigid support member 308 attached to the gaming machine 310.

Accordingly, there is provided a new and improved adjustable game stool assembly which uniquely provides an elongated base member with a guided entry portion at one end which allows a casino attendant to easily slide the game stool assembly into engagement with the gaming machine. Furthermore, locking pins are provided for preventing the detachable game stool assembly from being accidentally detached from its respective gaming machine. Interlocking the adjustable game stool assembly to its respective gaming machine is quickly and easily accomplished by a casino attendant and merely requires actuation of the locking pins 314. In the interlocked position, the game stool assembly is fixed and stable and cannot accidentally disengage from the gaming machine.

Figure 33:
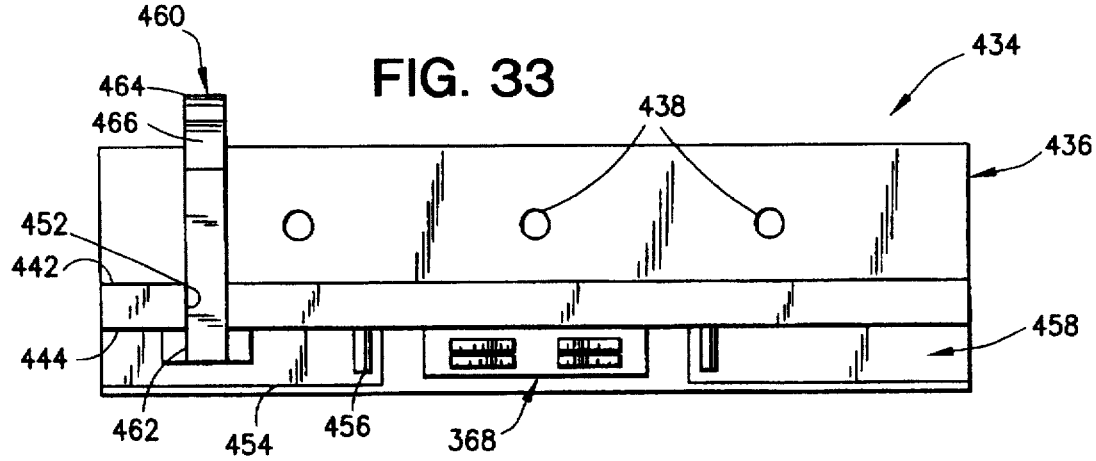
FIG. 33 is a front elevational view of the alternative locking mechanism and rigid support member of the seventh embodiment of the subject invention.
Figure 31:
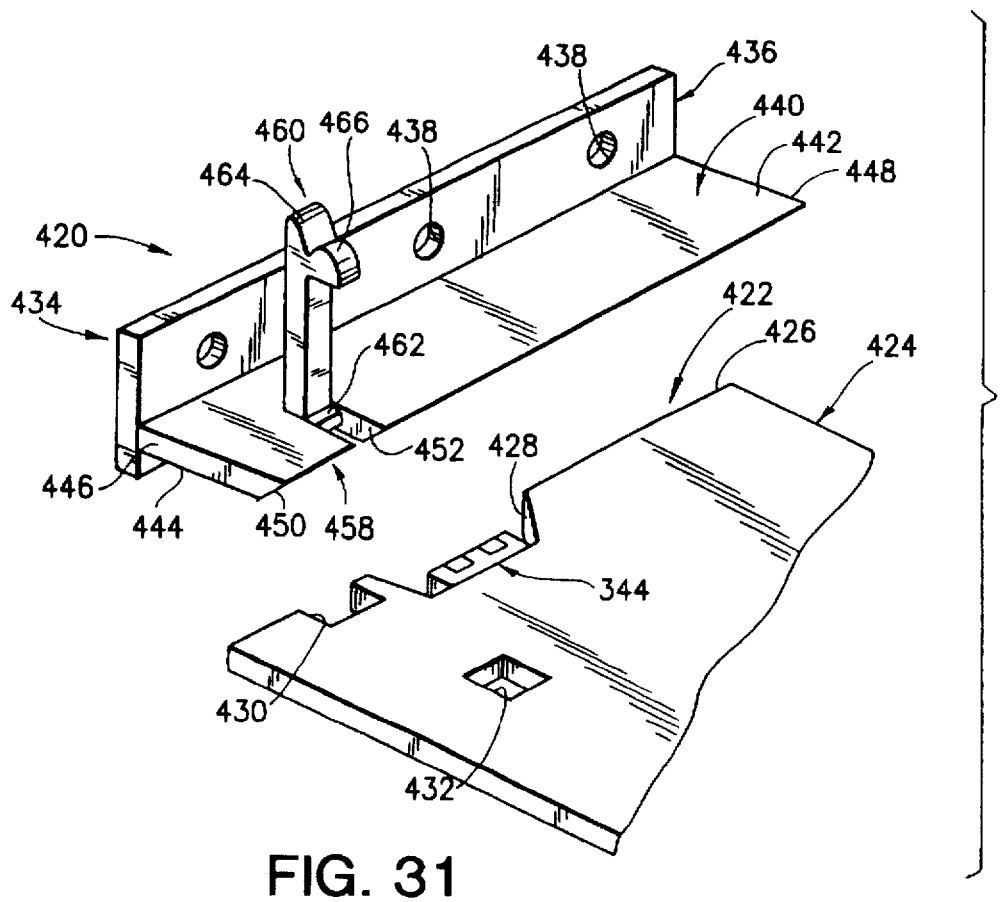
FIG. 31 is an exploded perspective view, partially in section of the seventh embodiment of the subject invention with an alternative locking mechanism.
Figure 32:
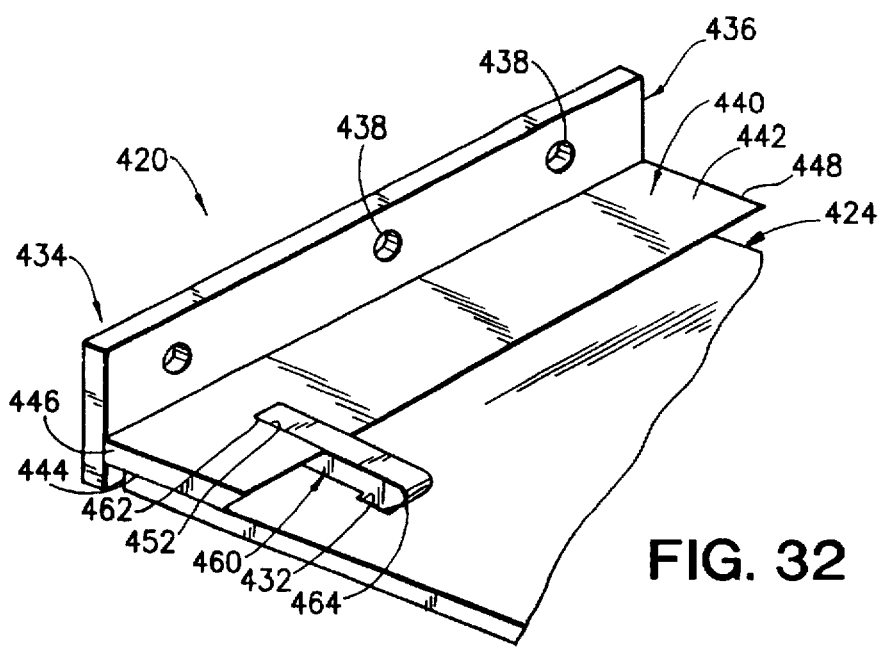
FIG. 32 is a perspective view, partially in section, of the seventh embodiment of the subject invention with an alternative locking mechanism.

Referring to FIGS. 31-33, an alternative embodiment of the elongated base member, rigid support member and locking mechanism is shown and is designated by the reference numeral 420. The guided engagement portion 422 of the base member 424 comprises a distal edge 426, a tapered recessed region 428 and a notched region 430. A locking recess 432 is provided in a spaced apart relationship from the notched region 430 disposed in the distal edge 426 of the base member 424. The first connector 344 of the detachable connector configuration 318 is fixed within the tapered recess region 428 of the guided engagement portion 422 of the base member 424.

The rigid support member 434 comprises an elongated upstanding rear base portion 436 having a plurality of spaced apart bolt receiving apertures 438, and a cantilevered portion 440 having an upper surface 442, a lower surface 444, opposed side edges 446, 448, a tapered front edge 450 and an open ended passage 452 extending from the upper surface 442 to the lower surface 444. Additionally, a pair of elongated stop members 454 and a pair of guide posts 456 extend downwardly from the lower surface 444 of the cantilevered portion 440. The upstanding rear base portion 436, lower surface 444 of the cantilevered portion 440, pair of elongated stop members 454 and pair of guide posts 456 define an engaging channel 458. The second connector 368 of the detachable connection configuration 318 is fixed within the engaging channel 458 of the rigid support member 434 and engages the first connector 344 when the guided engagement portion 422 of the base member 424 is installed within the engaging channel 458 of the rigid support member 434 as previously discussed.

The locking mechanism comprises a cantilevered elongated latching member 460. The latching member 460 includes a pivot end 462 and an engagement end 464. A locking projection 466 is provided adjacent the engagement end 464 of the latching member 460. The latching member 460 is pivotally connected to the rigid support member 434 at the pivot end 462 of the latching member 460 and is disposed within the open ended channel 452 of the cantilevered portion 440 of the rigid support member 434 as will be further explained below.

Turning to FIGS. 31 and 32, the installation of the adjustable game stool assembly 300 having the alternative base member, rigid support member and locking mechanism is illustrated. In general, the cantilevered elongated latching member 460 goes from a first position (FIG. 31) to a second position (FIG. 32) after the guided engagement portion 422 of the base member 424 is inserted within the engaging channel 458 of the rigid support member 434.

Initially, the guided engagement portion 422 of the elongated base 424 is slidably inserted within the engaging channel 458 of the rigid support member 434. As the guided entry portion 422 is slidably inserted within the engaging channel 458 the tapered recessed region 428 cooperates with the guide posts 456 of the rigid support member 434 so as to align the first electrical connector 344 and the second electrical connector 368 and to align the elongated latch member 460 with the notched region 430 and the locking recess 432 of the elongated base member 424.

At the first position, the engagement end 464 of the latching member 460 projects above and is generally perpendicular to the upper surface 442 of the cantilevered portion 440 of the rigid support member 434. Additionally, the locking projection 466 of the latching member 460 is spaced a distance from the locking recess 432 of the base member 424.

At the second position, the latching member 460 has been rotated about its pivot end 462 so that the engagement end 464 of the latching member 460 projects beyond the tapered edge 450 of the cantilevered portion 440 and is generally perpendicular to the upstanding rear base portion 436 of the rigid support member 434. In addition, the locking projection 466 of the latching member 460 engages the aligned locking recess 432 of the elongated base 424. As a result, the rigid support member 434 and the elongated latch member 460 effectively prohibit longitudinal and lateral movement of the base member 424 relative to the base of the gaming machine and prohibit accidental disengagement of the guided engagement portion 422 of the base member 424 from the engagement channel 458 of the rigid support member 434.

To release the game stool assembly 300 from the gaming machine 310, an attendant merely rotates the latching member 460 from its second position back to its first position and then merely slidably disengages the guided engagement portion 422 of the elongated base member from the engagement channel 458 of the rigid support member 434.

Accordingly, there is provided a new and improved adjustable game stool assembly which uniquely provides an elongated base member with a guided entry portion at one end which allows a casino attendant to easily slide the game stool assembly into engagement with the gaming machine. Furthermore, an elongated latch member is provided for preventing the detachable game stool assembly from being accidentally detached from its respective gaming machine. Interlocking the adjustable game stool assembly to its respective gaming machine is quickly and easily accomplished by a casino attendant and merely requires rotation of the elongated latch member 416. In the interlocked position, the game stool assembly is fixed and stable and cannot accidentally disengage from the gaming machine.

While the invention has been described with reference to a preferred embodiment, it is apparent that various changes may be made in the assembly without departing from the spirit and scope of the invention as defined by the appended claims. For example, in the first and second embodiments of the subject invention, in lieu of the mechanism shown in FIGS. 2–5 for adjustably connecting the seat to the post or post assembly, an equivalent assembly such as a slide bearing rod structure having a locking means may be provided. Furthermore, a single locking plate may be used in lieu of the double locking plates shown in FIGS. 4 and 9. In the third embodiment of the subject invention, electrically operated gas cylinders and gas actuators may be used in lieu of electrical motors and actuators shown in FIG. 10. Furthermore, the electrical system may be designed to work off of a rechargeable battery network. In the fifth embodiment of the subject invention, a seat having a hollow arm which would house a retractable control pad configuration may be used in lieu of a collapsible control pad configuration which collapses to a position adjacent to the arm of the seat as shown in FIG. 13.

What is claimed is:

1. An adjustable game stool assembly which is mounted to a protrusion of a gaming machine, said assembly comprising:

an elongated base member having opposed front and rear edges, said elongated base member having a locking aperture disposed in a spaced apart relationship from said front edge, said front edge having a recess that is tapered to form a guided engaging portion for slidable detachable engagement and connection with said protrusion of the gaming machine;

a connecting means for engaging said locking aperture for securing said front edge of said base member to said gaming machine;

an adjustable seat configuration secured to said elongated base member adjacent said rear edge thereof, said adjustable seat configuration including:
a seat, and
adjustment means mounted on said elongated base member and connected to said seat for adjusting said seat relative to said elongated base member and said gaming machine; and a detachable electrical connection means interconnecting said front edge of said base member and said protrusion of the gaming machine for detachable electrical connection of said adjustment means to a power supply of said gaming machine.

2. An adjustable game stool assembly for a gaming machine as in claim 1, wherein said connecting means includes:

an extruded rigid support member, said support member including:
a substantially planar upstanding leg fixed to said gaming machine,
a rigid cantilevered arm extending outwardly from said upstanding leg, said arm having an upper surface, a lower surface, a tapered edge and an open ended passage extending from said upper surface to said lower surface, and
a pair of elongated stop members disposed in a spaced apart relationship and extending downwardly from said lower surface of said cantilevered arm, said upstanding leg, said cantilevered arm and said pair of elongated stop members defining an engaging channel for receiving said guided engaging portion of said base member; and
a cantilevered elongated latching member having a pivot end and an engagement end, said latching member having a locking projection adjacent said engagement end, said latching member positioned within said open ended passage of said cantilevered arm and rotatably mounted at said pivot end to said support member for movement from a first position in which said engagement end of said latching member extends above said rigid cantilevered arm to a second position spaced from said first position in which said engagement end of said latching member projects beyond said tapered edge of said cantilevered arm so that said locking projection engages said locking recess of said elongated base member after said front edge of said base member has been slidably inserted within said engaging channels of said rigid support member.

3. An adjustable game stool assembly for a gaming machine as in claim 2 wherein said detachable electrical connection means includes:

a first electrical connector fixed to said front edge of said elongated base member and electrically connected to said adjustment means of said adjustable seat configuration; and a second electrical connector fixed to said support member between said pair of elongated stop members and electrically connected to said power supply of said gaming machine, said first electrical connector corresponding to said second electrical connector for detachable electrical engagement of said first electrical connector with said second electrical connector.

4. An adjustable game stool assembly for a gaming machine as in claim 3, wherein said first electrical connector includes:

- a non-conductive housing having an upper surface, a lower surface, a front surface and a back surface, said back surface fixed to said front edge of said elongated base member, said upper surface and said front surface having a plurality of recesses having L-shaped cross-sections; and
- a plurality of base contacts fixed within said recesses of said housing and electrical connected to said adjustment means of said adjustable seat configuration.

5. An adjustable game stool assembly for a gaming machine as in claim 3, wherein said second electrical connector includes:

- a non-conductive housing having an upper surface, a lower surface and a front surface, said upper surface fixed to said rigid support member; and
- a plurality of resilient V-shaped conductive wiping arms projecting from said front surface of said housing and electrically connected to said power supply of said gaming machine, each V-shaped wiping arm having a first end fixed to said front surface of said housing and a second end slidably engaged with said front surface of said housing, the apex of each V-shaped wiping arm defining intermediate projecting contact point.

* * * * *